United States Patent
Zizzamia

[19]
[11] Patent Number: 5,893,072
[45] Date of Patent: Apr. 6, 1999

[54] INSURANCE CLASSIFICATION PLAN LOSS CONTROL SYSTEM

[75] Inventor: Frank M. Zizzamia, Avon, Conn.

[73] Assignee: Aetna Life & Casualty Company, Hartford, Conn.

[21] Appl. No.: 665,663

[22] Filed: Jun. 20, 1996

[51] Int. Cl.⁶ .................................................. G06F 19/00
[52] U.S. Cl. ........................................ 705/4; 705/4; 705/5
[58] Field of Search .............................................. 705/4, 5

[56] References Cited

U.S. PATENT DOCUMENTS

| | | | |
|---|---|---|---|
| 5,128,859 | 7/1992 | Carbone et al. | 364/401 |
| 5,191,522 | 3/1993 | Bosco et al. | 364/401 |
| 5,613,072 | 3/1997 | Hammond et al. | 395/204 |
| 5,636,117 | 6/1997 | Rothstein | 395/204 |
| 5,655,085 | 8/1997 | Rayan et al. | 364/401 R |

*Primary Examiner*—Allen R. MacDonald
*Assistant Examiner*—M. Irshadullah
*Attorney, Agent, or Firm*—McCormick, Paulding & Huber

[57] ABSTRACT

A loss control system for an insurance classification plan has a policy holder database, a predictive apparatus and a derived actual loss ratio generator. The policy holder database generates signals indicative of the premium, actual loss, a one a plurality of classification plan variable values and an actual loss ratio for each policy holder. The predictive apparatus generates a plurality of predicted loss ratio signals indicative of predicted loss ratios of the policy holders. The derived actual loss ratio generator generates signals which are indicative of a difference between the predicted loss ratio and the actual loss ratio of the policy holders.

11 Claims, 10 Drawing Sheets

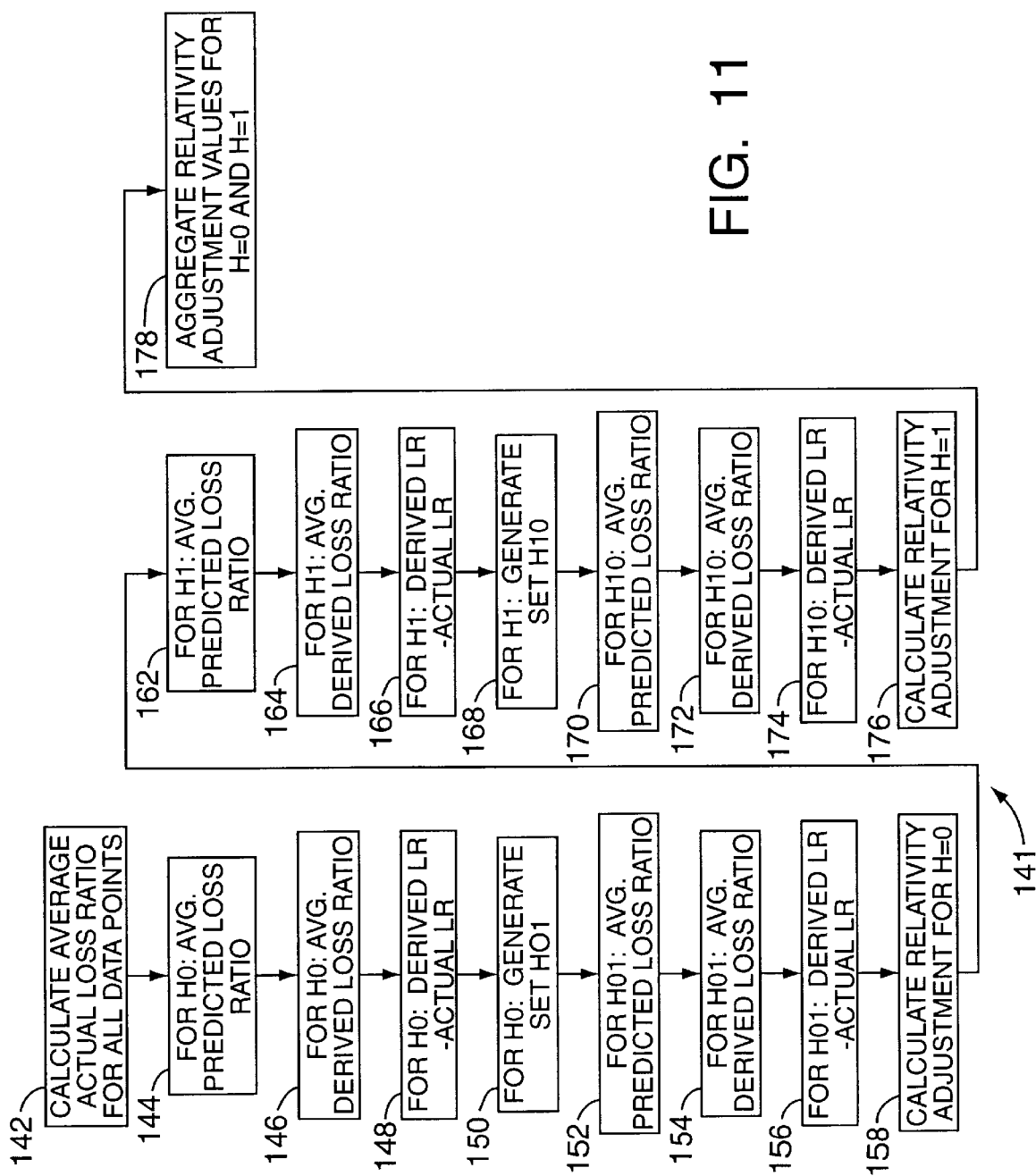

INSURANCE CLASSIFICATION PLAN LOSS CONTROL SYSTEM

FIELD OF THE INVENTION

The present invention relates generally to loss control systems as applied to the field of insurance, and specifically to loss control systems which have an improved ability to predict insurance loss ratios.

BACKGROUND OF THE INVENTION

Ideally, an insurance policy holder pays to his insurance company a premium which is a cost for a period of insurance coverage whose magnitude is proportional to his insurance claim(s), also known as losses. A loss ratio, which is a ratio of loss(es) to premium(s), is an effective measure of premium pricing. For example, if a policy holder has losses of $800 and is charged $1000 in premiums, then the loss ratio for the policy holder is:

$$800/1000=0.80 \qquad (1)$$

Similarly, if a policy holder has losses of $400 and is charged $800 in premiums, then the loss ratio for the policy holder is:

$$400/800=0.50 \qquad (2)$$

The first of the above two loss ratios, 0.80, is greater than the second loss ratio 0.50. Accordingly, the first loss ratio indicates a policy holder who is charged too little for his premiums with respect to the second policy holder, who is charged too much for his premiums. Similarly, a group of policy holders has a loss and a premium. The loss of a group is a sum of losses of policy holders in the group, and the premium of a group is a sum of premiums of policy holders in the group.

In the highly competitive insurance industry, companies compete for clients by offering lower premiums. As a result, some policy holders who are responsible for high losses are charged too little for premiums. Other policy holders with low losses must then pay high premiums to compensate for those with high losses. An insurance company which charges a policy holder high premiums cannot expect to retain that policy holder if other insurance companies will charge the policy holder lower premiums. Low loss ratio policy holders, like the second policy holder in the above example, are likely to switch to another insurance company which will charge them lower premiums. Thus, an insurance company will tend to lose customers who have low loss ratios while retaining those with high loss ratios. This leads to the undesirable situation of having only policy holders which incur high losses. An insurance company with mostly high loss clients will pay its clients large amounts of money in insurance claims, leaving less money for the insurance company to retain. Furthermore, an insurance company will have to raise premiums to cover the large amount of claims, causing even more policy holders to switch.

To retain the more desirable low loss policy holders, insurance companies establish a desired average loss ratio, which is the ratio of losses of all policy holders to premiums of all policy holders. For example, if an insurance company sets the desired average loss ratio to 0.60, then each policy holder should have a loss ratio of 0.60. Where a first policy holder has losses of $800 and a second policy holder has losses of $400, their respective premiums P1 and P2 would ideally be set so that:

$$\$800/P1=0.60 \qquad (3)$$

$$\$400/P2=0.60 \qquad (4)$$

Thus, solving for P1 and P2, the premium of the first policy holder would be $1333.33 and the premium of the second policy holder would be $666.67. It is further apparent that if an insurance company successfully establishes a desired average loss ratio, the average loss ratio represents a portion of the total premiums which the insurance company pays out in losses. For example, if the average loss ratio for all policy holders is 0.60, then the insurance company pays out 60% of all premiums to policy holders in the form of losses. The insurance company consequently retains the remaining 40% of all premiums received from policy holders.

Though an overall average loss ratio may be established, in general loss ratios of given groups of policy holders exceed the average loss ratio, while other loss ratios of other groups of policy holders are below the average loss ratio. A group with an above average loss ratio is underpriced, or pays too little in premiums in light of the losses sustained by the group. Similarly, a group with a below average loss ratio is overpriced, or paying too much in premiums. Thus, premiums for groups with higher than average loss ratios should be increased, and premiums for groups with lower than average loss ratios should be decreased in order to obtain equal loss ratios among all groups. Groups of policy holders with above average or below average loss ratios indicate that the insurance company has not successfully predicted the losses of a policy holder based on his characteristics.

Though insurance companies generally prefer to establish a uniform loss ratio for all policy holders, there are situations where allowing a group to have a higher than average loss ratio is a desired business strategy. For example, if an insurance provider is attempting to attract a certain group, the insurance provider may want to charge the group lower premiums than would normally be expected in light of the expected losses of the group. The lower premiums result in a loss ratio of the group which is higher than an loss ratio average.

Regardless of the particular business strategy, it is desirable to provide a loss system which successfully establishes a desired average loss ratio for policy holders. If a given control system does not successfully establish a desired average loss ratio for policy holders, groups of policy holders will have higher loss ratios than desired, indicating that the groups are paying lower premiums than desired. Crucial to establishing a desired average loss ratio is an ability to predict losses of a policy holder so that a premium can be determined accordingly. Insurance companies use a classification plan to predict losses of existing and potential insurance policy holders based on policy holder characteristics obtained by application, questionnaire, credit check and other factual inquiries. A classification plan uses known characteristics of a policy holder to determine the likelihood that the policy holder will submit claims to the insurance company, thereby incurring losses. A classification plan is also used to determine an expected size of claims based on known characteristics of the policy holder. An insurance company which does not accurately predict losses of a policy holder, probably uses a classification plan which does not appropriately utilize known characteristics of the policy holder.

It would be advantageous to provide a system which identifies policy holders which are underpriced or overpriced, i.e. paying too little or too much, respectively, in premiums.

It would also be advantageous to provide a system which improves a classification plan so that the classification plan better predicts the losses of a policy holder based on the known characteristics of the policy holder.

Furthermore, it is often difficult to determine whether improvements to a classification plan are optimal, or whether further attempts to improve the classification plan will actually provide additional improvements. It would be advantageous to provide a system which determines whether an optimal classification plan has been generated.

SUMMARY OF THE INVENTION

It is an object of the present invention to provide a loss control system which improves a classification plan so that the classification plan better predicts the losses of a policy holder based on the known characteristics of the policy holder.

It is a further object of the present invention to provide a loss control system which determines whether an optimal classification plan has been generated.

According to the present invention, a loss control system for an insurance classification plan, the insurance classification plan having a classification plan variable which represents an attribute of a plurality of policy holders, the classification plan variable having a plurality of classification plan variable values, wherein each of the policy holders has a premium, an actual loss, a one the plurality of classification plan variable values, and an actual loss ratio, which actual loss ratio is a ratio of the actual loss to the premium, comprises a policy holder database, a predictive apparatus and a derived actual loss ratio generator. The policy holder database generates a plurality of classification plan variable value signals, wherein each of the classification plan variable value signals is indicative of the classification plan variable value of a policy holder of the plurality of policy holders. The policy holder database furthermore generates a plurality of actual loss signals, wherein each of the actual loss signals is indicative of the actual loss of a policy holder of the plurality of policy holders, and further generates a plurality of premium signals, wherein each premium signal in the plurality of premium signals is indicative of the premium of a policy holder of the plurality of policy holders, and further generates a plurality of actual loss ratio signals, wherein each of the actual loss ratio signals is indicative of the actual loss ratio of a policy holder of the plurality of policy holders. The predictive apparatus receives the plurality of classification plan variable value signals and the actual loss ratio signals, and generates in dependence thereupon a plurality of predicted loss ratio signals. Each of the predicted loss ratio signals is indicative of a predicted loss ratio of a policy holder of the plurality of policy holders. The derived actual loss ratio generator receives the plurality of classification plan variable value signals, the actual loss ratio signals and the predicted loss ratio signals, and generates in dependence thereupon signals which are indicative of a difference between the predicted loss ratio and the actual loss ratio of a policy holder of the plurality of policy holders.

According to another aspect of the present invention, a method of controlling loss for an insurance classification plan, the insurance classification plan having a classification plan variable which represents an attribute of a plurality of policy holders, the classification plan variable having a plurality of classification plan variable values, wherein each of the policy holders has a premium, an actual loss, a one the plurality of classification plan variable values, and an actual loss ratio, which actual loss ratio is a ratio of the actual loss to the premium, comprises the steps of generating a plurality of classification plan variable value signals, wherein each of the classification plan variable value signals is indicative of said classification plan variable value of a policy holder of the plurality of policy holders; generating a plurality of actual loss signals, wherein each of the actual loss signals is indicative of the actual loss of a policy holder of the plurality of policy holders; generating a plurality of premium signals, wherein each premium signal in the plurality of premium signals is indicative of the premium of a policy holder of the plurality of policy holders; generating a plurality of actual loss ratio signals, wherein each of the actual loss ratio signals is indicative of the actual loss ratio of a policy holder of the plurality of policy holders; generating, in dependence upon said plurality of classification plan variable value signals and upon said actual loss ratio signals, a plurality of predicted loss ratio signals, wherein each of the predicted loss ratio signals is indicative of a predicted loss ratio of a policy holder of the plurality of policy holders; and generating, in dependence upon said plurality of classification plan variable value signals, said actual loss ratio signals and said predicted loss ratio signals, signals which are indicative of a difference between the predicted loss ratio and the actual loss ratio of a policy holder of the plurality of policy holders.

BRIEF DESCRIPTION OF THE DRAWINGS

FIG. 11 is a schematic illustration of a process performed by the relativity modifier of FIG. 6.

DESCRIPTION OF PREFERRED EMBODIMENT

Figure 1:
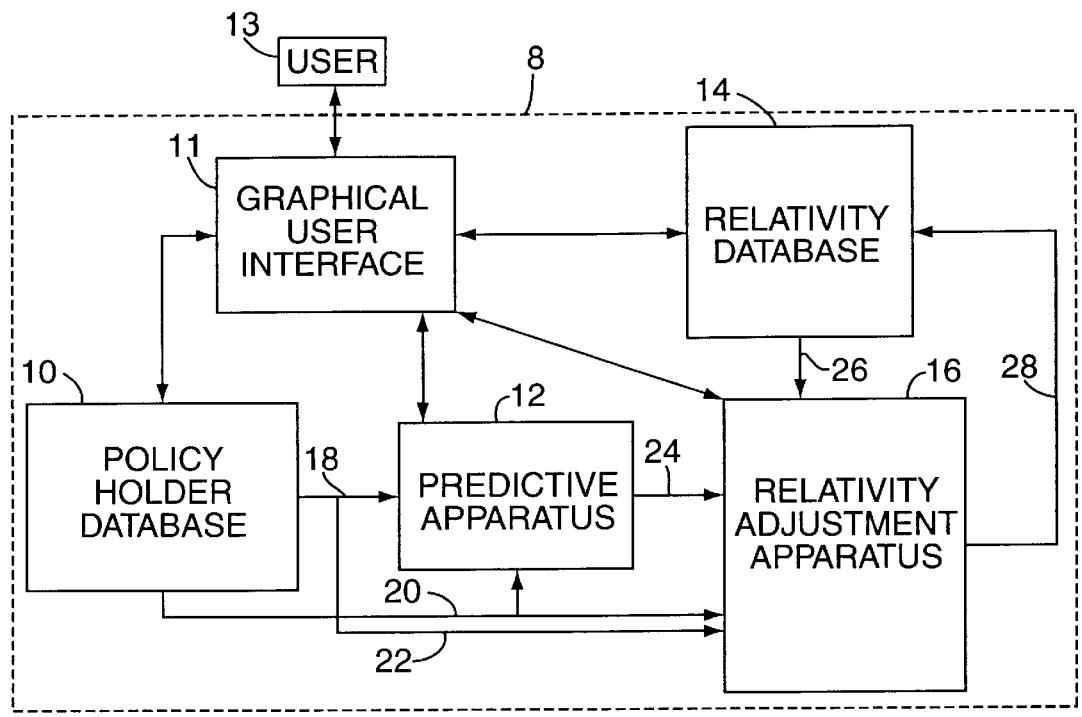
FIG. 1 is a schematic illustration of a loss control system provided in accordance with the present invention.

The present invention is described with respect to an insurance classification plan application, but those skilled in the art will recognize that the present system is readily adaptable to other insurance-related applications as well as to other fields. These other applications include those in which a system must predict a future value of a parameter based on other, known parameters.

The following is a short glossary of terms used herein.

Actual Loss

The losses paid to a policy holder.

Bin

A collection of data points whose predicted loss ratios differ from an average predicted loss ratio by a prescribed number of standard deviations.

Classification Plan

A system for classifying a potential losses of insurance policy holders, and for determining premiums of insurance policy holders.

Classification Plan Variable

An attribute of policy holders which is relevant to determining losses of policy holders.

Classification Plan Variable Value

A value of a classification plan variable. A policy holder has a classification plan variable value for each classification plan variable in a class plan.

Similarly, a set of policy holders can have a prescribed classification plan variable.

Data Point

Information associated with a policy holder, including classification plan variable values, premiums paid, actual losses and predicted loss ratio of the policy holder Group A set of consecutive bins with substantially similar actual loss ratios.

Loss Ratio

Ratio of losses to premiums, either of an individual policy holder or a group of policy holders.

Predicted Loss

A predicted value of policy holder losses based upon classification plan variable values of the policy holder.

Rate Factor

A value which is indicative of all classification plan variable values of a policy holder.

Relativity

A value which has a one-to-one correspondence with a classification plan variable value and which is indicative of the degree to which a value of a classification plan variable is associated with an expected loss. A relativity is preferably relative to the number 1.0, thus a relativity value which is greater than 1.0 indicates that a value of a classification plan variable is associated with a high expected loss.

In a given classification plan, classification plan variables such as age, sex and marital status of policy holders are indicative of predicted losses, or potential future losses, of the policy holders. The classification plan variables are therefore used in determining an amount, or premium, to charge policy holders. Each policy holder has a value of each classification plan variable, for example, whether the age of the policy holder is sixteen or forty. A classification plan variable value determines a numerical value, called a relativity, for the classification plan variable. A relativity indicates how strong of a relation there is between a value of a classification plan variable and an expected loss. A relativity is preferably expressed as a value which is relative to the value 0.0. Thus, a relativity which is close to 0.0 indicates a weak relation between a value of a classification plan variable and expected losses of a policy holder, while a relativity which is much greater than 0.0 indicates a strong relation between a value of a classification plan variable and expected losses of a policy holder.

For example, in a fictitious classification plan, a variable A represents age. A relativity for A when A has the value 16 is 2.5, while the relativity for the variable A when A has the value 75 is 0.2:

$$A=16, R_A=2.5 \quad (5)$$

$$A=75, R_A=0.2 \quad (6)$$

A relativity for a married variable M when the married variable M has a value TRUE is 0, while the relativity for the married variable M when the married variable M has a value FALSE is 0.1:

$$M=TRUE, R_M=0 \quad (7)$$

$$M=FALSE, R_M=0.1 \quad (8)$$

The relativities for all variables are added to a base factor value BF. The resulting sum of the base factor BF and the relativities for the classification plan variables is a rate factor RF. In the example above, where only two classification plan variables exist, the rate factor is:

$$RF=BF+(R_A+R_M) \quad (9)$$

The rate factor RF is multiplied by a base premium value BP, which is assigned to the policy holder based on the location of his residence, to obtain a premium rate P. The premium rate P is the rate which policy holders are charged for insurance. A process for determining a premium rate in the above example for sample territories is:

$$\text{If (territory=New York) then } BP=700, \text{ else} \quad (10)$$

$$\text{If (territory=Rochester) then } BP=1300 \quad (11)$$

$$P=RF*BP \quad (12)$$

If relativities do not have values which accurately reflect predicted losses, then a resulting premium P will be too high or too low, resulting in loss ratios which are too low or too high, respectively. As discussed hereinabove, it is undesirable to have loss ratios which are too low or too high. It is therefore necessary to provide a system which identifies policy holders which are underpriced or overpriced, and adjusts relativities so that premiums which policy holders are charged will be proportional to predicted losses of the policy holders.

Conventional loss control systems attempt to correct values of relativities one-at-a-time through classification plan variable direct measurements. Persons experienced with classification plans manually adjust relativities given characteristics of policy holders who have undesirably high or low loss ratios. Unfortunately, these remedial actions are rarely successful at adjusting the relativities optimally. Such ad hoc attempts at system correction often introduce further errors into premium calculations. The present invention is therefore directed to a system which adjusts relativities of a classification plan in a manner which improves the accuracy of premium calculations.

FIG. 1 shows a schematic illustration of a insurance classification plan loss control system 8 provided in accordance with the present invention. The loss control system 8 runs on computational hardware (not shown) in accordance with a prescribed process shown in FIG. 14 and described hereinafter. The computational hardware preferably includes a microcomputer based on a 80486 type microprocessor, and has such computer hardware and software as is necessary to perform functions described herein, such as a monitor, a hard drive, a disk drive, memory, a keyboard, a printer and a mouse.

A database 10 of policy holder information stores signals indicative of actual losses, premiums and classification plan variable values for each policy holder. The database 10 is preferably implemented with a commercial database product, such as DB2 by IBM. A predictive apparatus 12, as described hereinafter, receives from the database 10 on line 18 signals indicative of classification plan variable values of policy holders. The predictive apparatus 12 further receives from the database 10 on line 20 signals indicative of actual loss ratios of the policy holders. The predictive apparatus 12 generates predicted loss ratio signals indicative of predicted loss ratios of policy holders based on the signals received on lines 18 and 20. The predictive apparatus 12 is preferably implemented by neural network simulation software, such as SNNS by the University of Stuttgart.

The predictive apparatus 12 presents the predicted loss ratio signals on line 24. A relativity adjustment apparatus 16 receives the predicted loss ratio signals on line 24, signals indicative of the actual loss ratio on line 20 and signals indicative of the classification plan variable values on line 22. The relativity adjustment apparatus 16 further receives on line 26 a first set of relativity signals stored in a database 14 of relativity values of the classification plan variable values. In dependence on the signals received on lines 20, 22, 24 and 26, the relativity adjustment apparatus 16 generates relativity adjustment signals. The relativity adjustment signals are presented on line 28 to the database 14 of relativity values. The database 14 thereby adjusts the relativity signals stored therein, resulting in a 2nd set of relativity signals relativity values which better predict the losses of policy holders.

As described hereinafter, the relativity adjustment apparatus 16 comprises several components, and is best implemented by a combination of a statistical analysis package such as SAS, software written in a high level language such as C++, and a graphing utility such as Microsoft Excel. As is preferred with the database 10, the database 14 is constructed with a commercial database product, such as Paradox by Borland, Inc.

A graphical user interface 11 receives from display signals which are indicative of a command to display prescribed images and text to a user 13 of the loss control system 8. The graphical user interface 11 generates graphical signals in dependence on the display signals, and presents these signals to the user 13. The graphical signals are indicative of images and text to be displayed to a user 13 of the loss control system 8 in graphical form such as on a computer monitor (not shown). Similarly, the graphical user interface 11 receives from the user 13 input signals which are indicative of user input commands received via mouse, keyboard and other input devices (not shown). The graphical user interface 11 generates user command signals in dependence on the input signals from the user 13. The user command signals are presented to the database 14, the database 10, the predictive apparatus 12 and the relativity adjustment apparatus 16, each of which is responsive thereto and operates in accordance with as described hereinafter. Thus the user 13 interacts with the graphical user interface 11 to display information about policy holders and to direct actions of the loss control system 8, as described hereinafter. The graphical user interface 11 is preferably implemented with an off-the-shelf interface builder such as Microsoft Visual Basic.

Figure 2:
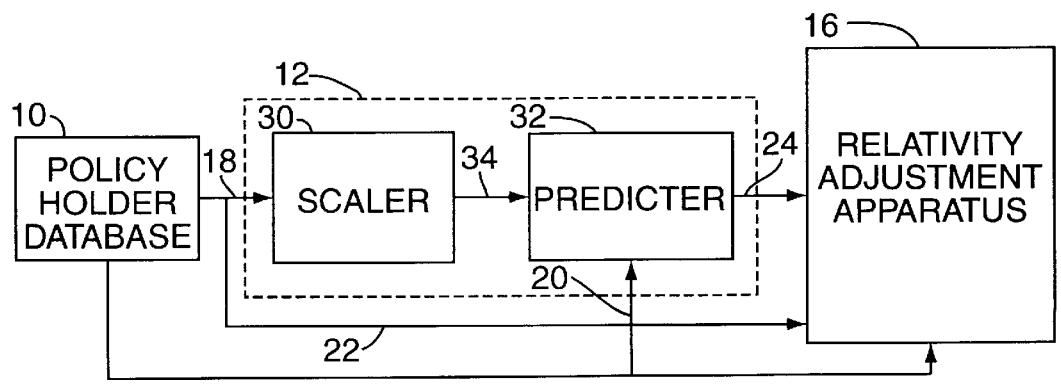
FIG. 2 is a schematic illustration of a predictive apparatus included in the loss control system of FIG. 1

The predictive apparatus 12 is now described in greater detail with reference to FIG. 2. The loss control system 8 generates the predictive apparatus 12 as shown in steps 216 and 217 (FIG. 14) in accordance with a process which follows immediately hereinafter. A scaler 30 receives the signals indicative of the classification plan variable values on line 18 and generates therefrom scaled variable signals indicative of scaled classification plan variable values on line 34. The scaler 30 thereby scales each classification plan variable value signal in order to enhance the information that the variable value signal is meant to convey. As described hereinafter, a scaling method which the scaler 30 employs for a classification plan variable value signal is selected so as to improve the granularity, or descriptiveness, of that classification plan variable value signal. Scaling techniques are known in the art, particularly in the field of statistical modeling, and include linear scaling, log scaling and z-scaling.

Figure 3:
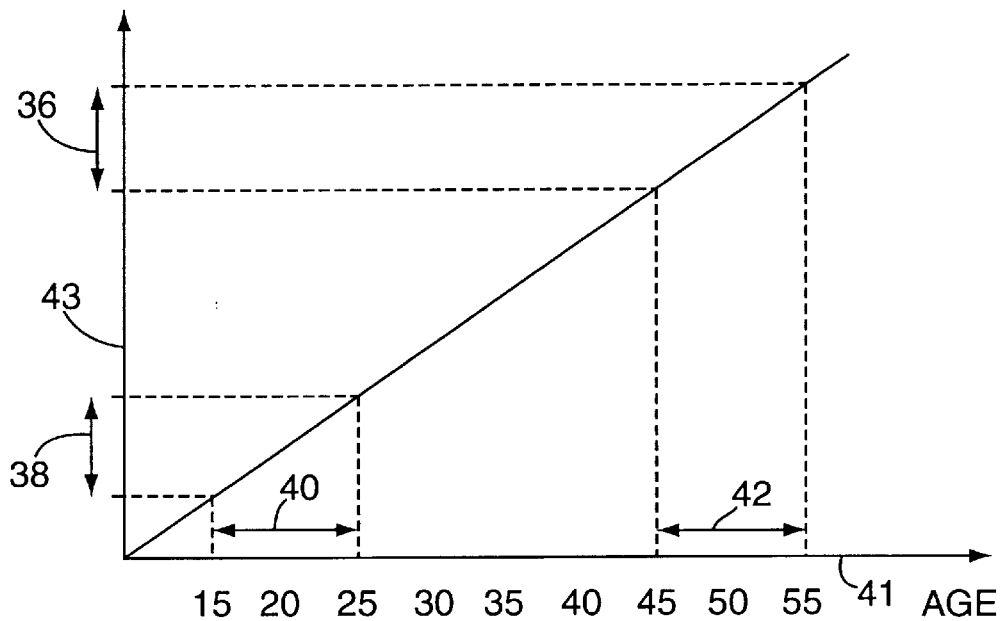
FIG. 3 is a diagrammatic illustration of a graph which illustrates linear scaling of a classification plan variable.
Figure 4:
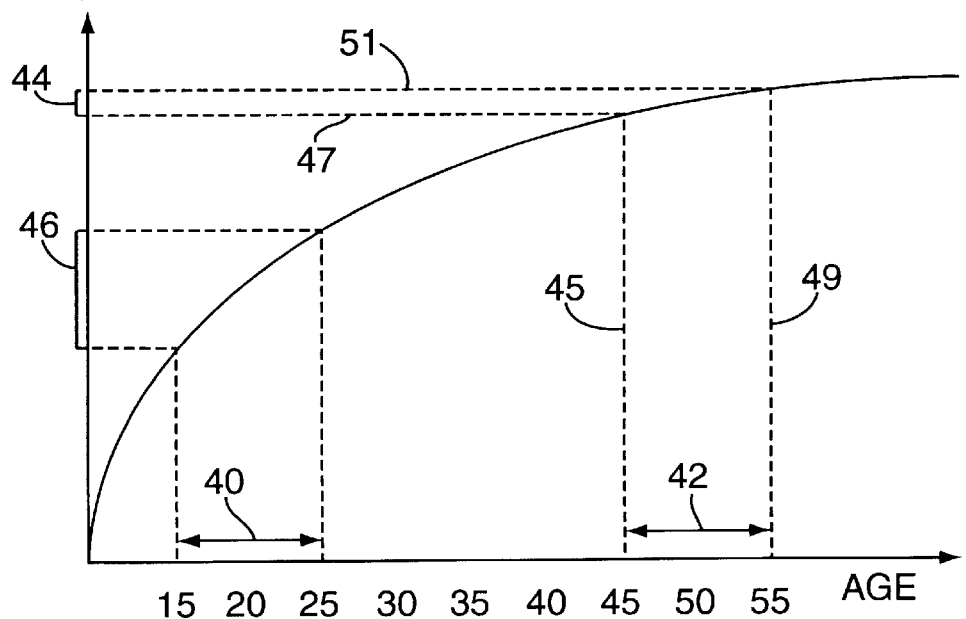
FIG. 4 is a diagrammatic illustration of a graph which illustrates logarithmic scaling of a classification plan variable.

FIGS. 3 and 4 are diagrammatic illustrations of two techniques for scaling a variable. Illustrated therein are a linear and a logarithmic scaling technique applied to a variable which represents age. The age of a policy holder is of interest in certain automobile insurance policies. Typically, younger policy holders have greater losses than older policy holders. The losses of older policy holders do not vary substantially above a certain age. Therefore, policy holders within one age bracket 40, those between the ages of sixteen and twenty-five, must be differentiated more strongly than those within an equally sized age bracket 42, those between the ages of forty-six and fifty-five. Scaled values of ages in the age bracket 40 must be in a wide range, while scaled values of ages in the age bracket 42 must be essentially equal.

FIG. 3 illustrates a linear scaling technique applied to the age variable. Along an X-axis 41 are shown age values for the age variable, while along a Y-axis 43 are shown scaled values of the age values. Since ranges of ages in both of the above age brackets 40 and 42 is ten years, a linear scaling of the age variable will scale the two age brackets 40 and 42 equally, resulting in equal scaled age ranges 36 and 38 respectively. Linear scaling therefore does not appropriately differentiate between the age brackets 40 and 42, and cannot reveal that a difference in losses between an age of sixteen and an age of twenty-five is far greater than a difference in losses between an age of forty-six and an age of fifty-five.

However, as shown in FIG. 4, a nonlinear scaling technique such as logarithmic scaling results in a larger scaled age range 46 for the age bracket 40, and simultaneously results in a smaller scaled range 44 for the age bracket 42. Ages in the age bracket 42 will be scaled to values in the scaled range 44. Values in the scaled range 44 do not vary significantly, indicating that ages in the age bracket 42 are not strongly differentiated, or essentially the same, for purpose of calculating loss ratios. In contrast, the values in a scaled range 46 vary considerably, indicating that ages in the age bracket 40 are strongly differentiated. It is equivalent in the art to say that values within a range which vary considerably exhibit high granularity. Applying the scaling technique illustrated by FIG. 4 to signals indicative of age variable values yields scaled variable signals which differentiate more among younger age ranges than among older age ranges.

Each variable is scaled with a technique that is appropriate given the use of the variable in the classification plan. Selection of appropriate scaling techniques is not limited to logarithmic and linear scaling. Other scaling techniques, such as exponential or Guassian, may be used as well. In general, the user 13 selects desired scaling techniques through the graphical user interface 11, as shown by step 216. Choosing the desired scaling technique for a given classification plan variable is an ad hoc process which the user 13 performs based on his experience. A default scaling technique of linear scaling is applied to classification plan variables unless the user 13 chooses otherwise.

As shown in step 217 (FIG. 14), the loss control system 8 generates, or configures, a predictor 32 after determining scaling techniques in step 216. Scaled variable signals indicative of the scaled classification plan variable values are presented on line 34 to the predictor 32 in FIG. 2. The predicter 32 generates on line 24 predicted loss ratio signals in dependence on the received scaled variable signals, as described hereinabove. The predicted loss ratio signals are indicative of a predicted loss ratio of a policy holder based on classification plan variable values of the policy holder. The predictive apparatus 12 as a whole thereby provides a correspondence, also called a mapping, from values of classification plan variables to a predicted loss ratio. Thus, future loss ratios of policy holders can be predicted given classification plan variable values of the policy holders.

The predicter 32 must produce a predicted loss ratio given a set of classification plan variable values. Multivariate statistical modeling curve fitting techniques provide a method for creating such a predicter. Curve fitting techniques generate a correspondence between prescribed sets of inputs and outputs. One such technique is multiple regression, described in "Intermediate Business Statistics: Analysis of Variance, Regression and Time Series" by Robert Miller and Dean Wichern, incorporated herein by reference.

However, in the preferred embodiment, the loss control system 8 employs neural network modeling algorithms executed on computational hardware to generate signals indicative of the predictive apparatus 12. A neural network is a nonlinear general purpose function approximator which is trained to learn an unknown function based on known inputs and corresponding outputs. Once the neural network learns the unknown function, the neural network is able to generate outputs for other sets of inputs, even input patterns to which the network was never exposed. Neural network topologies and training techniques, specifically those used in the preferred embodiment as disclosed hereinafter, are described in "Neural Networks: A Comprehensive Foundation" by Simon Haykin, also incorporated herein by reference.

Figure 5:
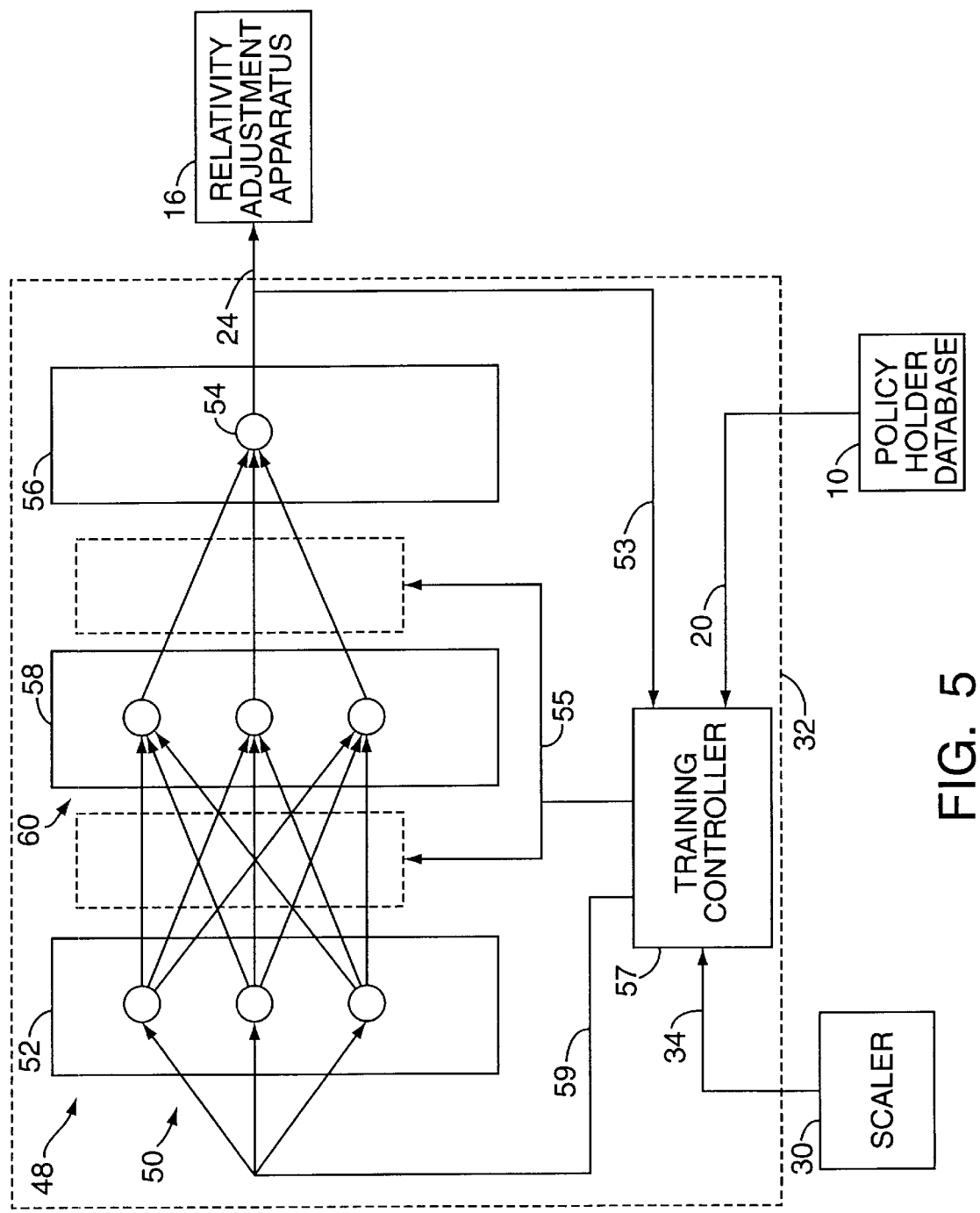
FIG. 5 is a schematic illustration of a neural network configured in accordance with the present invention.

FIG. 5 is a schematic representation of a neural network 48 used in the preferred embodiment as the predicter 32. As is known in the art, a neuron is defined as a processing unit which receives input signals and generates in dependence thereupon an output signal in accordance with a neuron function, wherein the neuron function is preferably a nonlinear function, such as a sigmoid function. A connection from a first neuron to a second neuron denotes that an output signal of the first neuron is also an input signal of the second neuron. Neurons are preferably grouped into layers, wherein the output signals of neurons in a first layer are also input signals of neurons in a second layer.

The neural network 48 is configured with input neurons 50, which have a one-to-one correspondence with classification plan variables, forming an input layer 52 which accepts scaled value signals on line 59 as inputs. Similarly, the neural network has a single output neuron 54, forming an output layer 56, which generates signals indicative of a predicted loss ratio on line 53. A single hidden layer 58 of hidden neurons 60 is coupled to both the input layer 52 and output layer 56, forming connections between neurons. The number of hidden neurons 60 in the hidden layer 58 is preferably the same as the number of input neurons 50 in the input layer 52. However, those skilled in the art may choose to have a different number of hidden neurons 60 in the hidden layer 58, depending on the details of a specific application of the present invention.

Each neuron in a layer is coupled to each neuron in the next layer. Thus, an output signal of a neuron in a layer is an input signal which is presented to each neuron in the next layer. For example, the hidden layer 58 receives output signals from the input layer 52. Each connection between neurons has a weight value indicative of a strength of the connection. Output signals presented by a neuron on an end of a connection are amplified in accordance with the weight value of the connection, and the neuron generates an amplified signal which is received by a neuron at the other end of the connection. Initially, weights are randomly set in a range close to zero, preferably a range between −0.1 and 0.1.

Training the network 48, which generates the predicter 32 in accordance with step 217 (FIG. 14), consists of presenting to the neural network 48 a training set comprising input signals and corresponding desired output signals. The input signals are the scaled variable signals presented on line 34 to the predicter 32. The desired output signals are the signals indicative of the actual loss ratio presented on line 20 to the predicter 32. A training controller 57 trains the network 48 by adjusting the weight values of the connections in accordance with a training process. In the preferred embodiment, the training process is backwards error propagation, described in "Neural Networks: A Comprehensive Foundation", referenced hereinabove. The weights are adjusted so that the network 48 produces output signals on lines 53 and 24 which are substantially equivalent to the desired output signals.

The training controller 57 generates weight adjustment signals on line 55 which are presented on line 53 to the connections, thereby adjusting the weights in accordance with the weight adjustment signals. Scaled variable signals which the training controller 57 receives on line 34 are presented as inputs to the network 48 on line 59. The training controller 57 receives the output signals of the network 48 on line 53 and compares them with the signals indicative of the actual loss ratio received on line 20. The weight adjustment signals are generated in accordance with the signals received on line 20 and on line 53 and further in accordance with the training process implemented by the training controller 57. The training controller 57 adjusts the weights during the training process until the difference between the output signal on line 53 and the desired output signal on line 20 is reduced to a desired minimum.

In the preferred embodiment, a randomly selected subset of the training set called a validation set is not used in training the neural network. The validation set is instead reserved by the training controller 57 to evaluate the performance of the neural network 48 during the training process. The use of a validation set prevents the neural network from "overlearning" the training set, or learning to process only those signals in the training set. A neural network which has overlearned its training set will, in general, perform poorly when presented with inputs which are not in the training set.

As described hereinabove, the training controller 57 stops training the network 48 when the output signals of the network 48 are substantially equivalent to desired output signals received on line 20. The predictive apparatus 12 then generates predicted loss ratio signals for each policy holder based on classification plan variable value signals of each policy holder, as shown in step 218 of FIG. 14. The predicted loss ratios generally differ from the actual loss ratios associated with the policy holders. Reasons for such differences between actual and predicted loss ratios include an imperfect predictive apparatus, as well as uncharacteristically high losses for a individual during a given time period. The classification plan variable values, predicted loss ratio, actual loss and premium of a policy holder is hereinafter referred to as a "data point". A single data point represents the information associated with a policy holder, including the classification plan variable values, the premiums paid, the actual losses and the predicted loss ratio for the policy holder.

Figure 6:
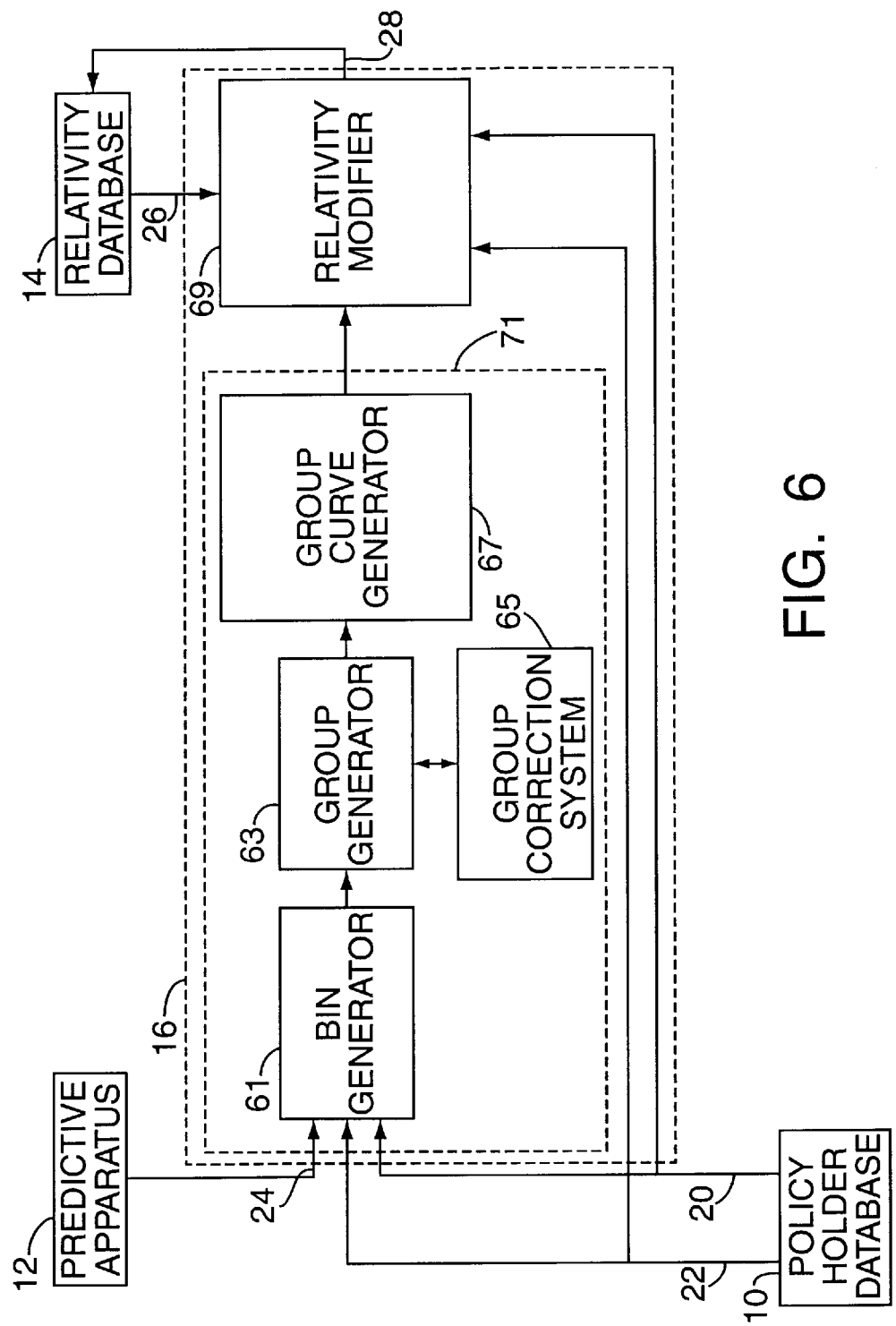
FIG. 6 is a schematic illustration of a relativity adjustment apparatus of FIG. 1.
Figure 7:
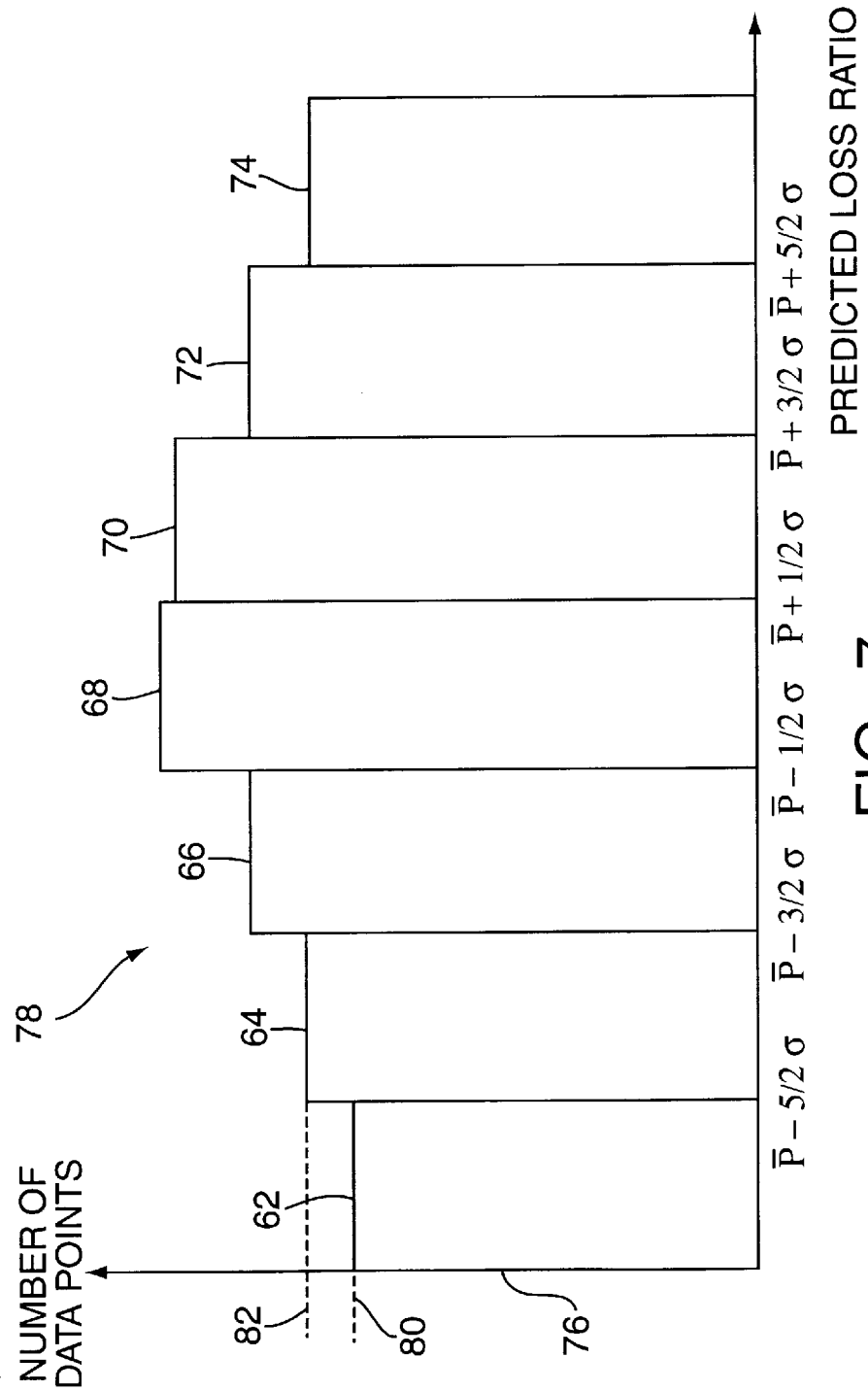
FIG. 7 is a diagrammatic illustration of a chart showing "bins" of data points.

As shown in FIG. 6, the relativity adjustment apparatus 16 includes a bin generator 61, a group generator 63, a group correction apparatus 65, a group curve generator 67 and a relativity modifier 69, each of which is described hereinafter. In the preferred embodiment, the bin generator 61, the group generator 63, the group correction apparatus 65, the group curve generator 67 and the relativity modifier 69 are all software modules executed on the computational hardware. FIG. 7 illustrates bins of data points which the bin generator 61 generates, as shown by step 220 of FIG. 14. The use of bins provides a convenient method of representing multiple data points and referencing multiple data points as a single unit. In an embodiment of the present invention, the bin generator 61 sorts data points (not shown) by their predicted loss ratios, and a fixed number of consecutive data points constitute a bin. Therefore, if there are N data points, and B bins, then each bin constitutes N/B consecutive data points.

In the preferred embodiment, the bin generator 61 calculates an average $P_{avg}$ of all predicted loss ratios and the standard deviation $\sigma_P$ of all predicted loss ratios. The bin generator 61 then generates bin signals which are indicative of sets of data points having predicted loss ratios which differ from an average predicted loss ratio by a prescribed number of standard deviations. FIG. 7 is a diagrammatic illustration of a chart 78 which includes bins 62, 64, 66, 68, 70, 72 and 74. Bin 74 comprises all data points with predicted loss ratios that are greater than the average predicted loss ratio $P_{avg}$ by more than 2.5 standard deviations, or $\frac{5}{2} \sigma_P$. Bin 62 comprises all data points with predicted loss ratios which are less than the average predicted loss ratio $P_{avg}$ by more than 2.5 standard deviations, or $\frac{5}{2} \sigma_P$. Bin 68 comprises all data points with predicted loss ratios which differ from the average predicted loss ratio $P_{avg}$ by less than 0.5 standard deviations, or $\frac{1}{2} \sigma_P$. Bin 70 comprises all data points with predicted loss ratios which exceed the average predicted loss ratio $P_{avg}$ by between 0.5 standard deviations and 1.5 standard deviations, or $\frac{1}{2} \sigma_P$ and $\frac{3}{2} \sigma_P$. Bin 66 comprises all data points with predicted loss ratios which are less than the average Pavg predicted loss ratio by between 0.5 standard deviations and 1.5 standard deviations, or $\frac{1}{2} \sigma_P$ and $\frac{3}{2} \sigma_P$.

In the example illustrated by FIG. 7, there are seven bins 62, 64, 66, 68, 70, 72 and 74. Each bin has a range of one standard deviation $\sigma_P$, except for the first and last bins which contain all data points which have predicted loss ratios that are less than $\frac{5}{2} \sigma_P$ below the average and more than $\frac{5}{2} \sigma_P$ above the average, respectively. It is preferred that there is a large number of bins, yet each bin must also comprise a large number of data points. Accordingly, it is preferred that there are between 20 and 30 bins, with each bin having a range of approximately $\frac{1}{11} \sigma_P$ except for the first and last bins which contain all data points below and above a threshold, respectively. Those skilled in the art will note that the range of approximately $\frac{1}{11} \sigma_P$ discussed hereinabove depends upon the scaling method which the scaler 30 uses, and another range which is not approximately $\frac{1}{11} \sigma_P$ may be used without departing from the scope of the present invention.

As described hereinabove, the bin generator 61 generates bins of data points, and each bin comprises data points having predicted loss ratios which differ from the average predicted loss ratio by a prescribed number of standard deviations. There may be many data points with predicted loss ratios which are almost identical to the average predicted loss ratio. There may also be very few data points with predicted loss ratios which are greater than the average predicted loss ratio by more than, for example, one standard deviation. Accordingly, bins do not in general comprise equal numbers of data points. For example, the bins 62, 64, 66, 68, 70, 72 and 74 shown in FIG. 7 each comprise a number of data points. The number of data points in a bin, called the size of the bin, is indicated on a Y-axis 76 of the graph 78. For example, the bin 62 has a size 80 and the bin 64 has a size 82. The size 82 of bin 64 is greater than the size 80 of bin 62, indicating that bin 64 comprises more data points than bin 62.

It is also possible that a bin may comprise no data points. For example, if the predictive apparatus 12 perfectly predicts loss ratios for policy holders and all policy holders are perfectly priced, then all policy holders will have equal predicted loss ratios. Thus, all data points will have predicted loss ratios equal to an average predicted loss ratio. Consequently, all data points will be included in a single bin, and remaining bins will include no data points.

Figure 14:
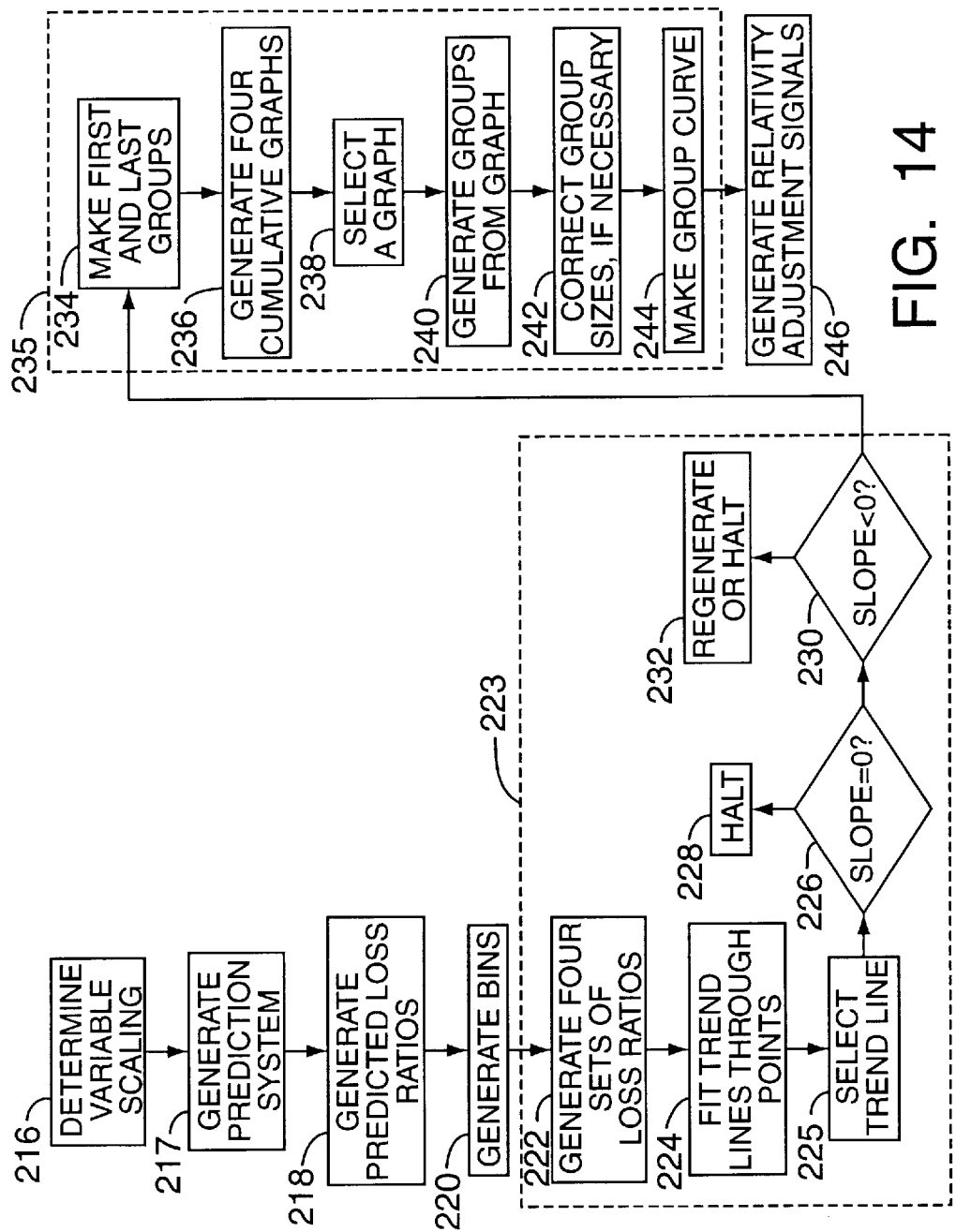
FIG. 14 is a schematic illustration of a process performed by the loss control system of FIG. 1.

After the bin generator 61 generates bins, the group generator 63 evaluates the predictive capability of the predictive apparatus 12 in a manner described hereinafter and designated by numeral 223 (FIG. 14). The group generator 63 calculates, for each bin, the sum of all actual losses and the sum of all premiums of data points of the bin. The group generator 63 further divides the sum of all actual losses of the bin by the sum of all premiums of the bin to calculate an actual loss ratio for each bin. This process is illustrated in Table 1.

TABLE 1

Loss Ratio Calculations for Each Bin

```
/* Calculate premiums and losses of each bin */
For all Data Points
{
    Determine which bin this data point is in
    Add premium of this data point to sum of all premiums for this bin
    Add actual losses of this data point to sum of all actual losses
    for this bin
}
/* Calculate a loss ratio for each bin */
For all Bins
{
    Loss Ratio of this bin = actual losses for this bin / premiums
    for this bin
```

In the preferred embodiment, the loss control system 8 also calculates a sum of the lowest 99% losses, a sum of the lowest 95% losses and a sum of the lowest 90% losses of data points which have non-zero losses. A highest loss in a set of the 99% lowest losses is known as a 99th percentile loss level. Similarly, a highest loss in a set of the 95% lowest losses is known as a 95th percentile loss level, and a highest loss in a set of the 90% lowest losses is known as a 90th percentile loss level. In calculating the sum of the lowest 99% losses, the loss control system 8 adds the losses of the data points with non-zero losses, except for a data point whose loss is in the highest 1% of all losses, in which case the loss control system 8 adds the 99th percentile loss level. Thus, when the loss control system 8 calculates the sum of the lowest 99% losses, losses do not exceed a prescribed maximum value which is the 99th percentile loss level.

With these three additional sums of losses, the loss control system 8 calculates a 99th percentile actual loss ratio, a 95th percentile actual loss ratio and a 90th percentile actual loss ratio for each bin by dividing each of the sum of the lowest 99% losses, the sum of the lowest 95% losses and the sum of the lowest 90% losses by the sum of all premiums of the bin, respectively. The four actual loss ratios of each bin are referred to as bin loss ratios. This process is shown as step 222 in FIG. 14 and is further illustrated in Table 2 below in pseudocode form.

TABLE 2

Loss Ratio Calculations for Each Bin at Different Percentile Losses

```
/* Calculate premiums and losses of each bin */
For all Data Points
{
    Determine which bin this data point is in
    Add premium of this data point to sum of all premiums for this bin
    Add actual losses of this data point to sum of all actual losses
        for this bin
    If (actual losses of this data point <99th percentile losses) then
        Add actual losses of this data point to sum of all 99th percentile
            losses
    else
        Add 99th percentile loss level to sum of all 99th percentile
            losses
    If (actual losses of this data point <95th percentile losses)
        then
        Add actual losses of this data point to sum of all 95th percentile
            losses
    else
        Add 95th percentile loss level to sum of all 95th percentile
            losses
    If (actual losses of this data point <90th percentile losses)
        then
        Add actual losses of this data point to sum of all 90th percentile
            losses
    else
        Add 90th percentile loss level to sum of all 90th percentile losses
}
/* Calculate loss ratios for each bin */
For all Bins
{
    Loss Ratio of this bin = actual losses / premiums for this bin
    99th Percentile Loss Ratio of this bin =
        99th Percentile losses / premiums for this bin
    95th Percentile Loss Ratio of this bin =
        95th Percentile losses / premiums for this bin
    90th Percentile Loss Ratio of this bin =
        90th Percentile losses / premiums for this bin
}
```

It is advantageous to calculate the three hereinabove-described loss ratios for the 90th, 95th and 99th percentile data points in order to remove atypically high losses from the actual loss ratio calculations, and replace the atypically high losses with prescribed maximum losses. For example, a policy holder can have one-time losses which are uncharacteristically high, and not indicative of expected future losses of the policy holder. It is therefore appropriate to filter out the uncharacteristically high losses, since they do not aid in future loss predictions.

Figure 8:
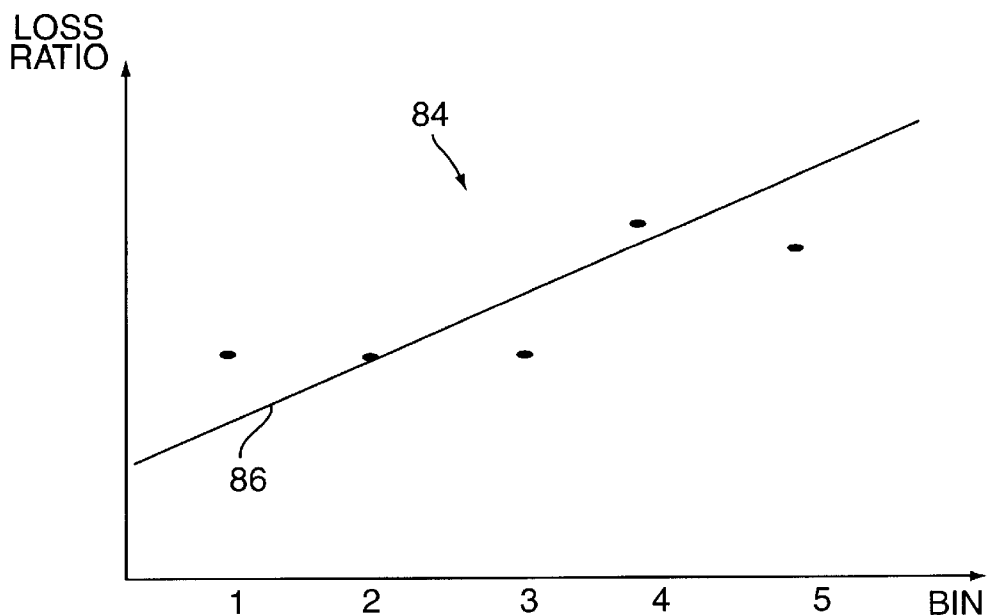
FIG. 8 is a diagrammatic illustration of a graph which illustrates a trend line through points indicative of loss ratios of bins.

The group generator 63 generates signals indicative of four sets of points. The four sets of points correspond to the four sets of bin actual loss ratios described hereinabove and in Table 2. The group generator 63 further generates, for each set of points, signals indicative of a trend line, as shown by step 224 in FIG. 14. The four trend lines are generated such that each is a best fit line through the corresponding set of points. In other words, a trend line is a best fit linear relationships among the points of a set of points. FIG. 8 shows a sample set of points 84 and a trend line 86 which is fit through the points 84, thus providing a linear approximation of loss ratios for the bins. Fitting a line through a set of points is known in the statistical arts, and is generally performed so as to minimize the mean square error in a loss ratio between the points and the line. The user 13 further selects a one of the four trend lines, as shown in step 225 in FIG. 14, in accordance with his expert knowledge as to which trend line is most representative of bin actual loss ratios. Those skilled in the art may select more than one trend line in performing the steps presented herein in accordance with the present invention.

Each trend line may have either a near zero slope, a negative slope or a positive slope. A trend line with a near zero slope indicates that loss ratios which the trend line approximates are essentially equal, implying that no policy holder has a loss ratio which is significantly greater than or less than that of another policy holder. It is equivalent in the statistical arts to say that the predicted loss ratios are not correlated with the bin loss ratios. A near-zero slope trend line occurs when the predictive apparatus 12 has not uncovered any inherent overpricing or underpricing of policy holders in the classification plan under consideration. In this case, classification plan relativity values are already valued such that each policy holder is charged a premium which is proportional to his losses. Therefore, all bins have nearly the same loss ratio, and no further manipulation of classification plan relativities will yield significant benefits in the resulting loss ratios. The loss control system 8 ceases further adjustments to relativity values in this case, as shown by steps 226 and 228 in FIG. 14.

A trend line with a negative slope indicates that lower numbered bins, which contain data points with lower predicted loss ratios, have higher bin loss ratios. In this case, predicted loss ratios do not estimate the bin loss ratios well. It is equivalent in the statistical arts to say that predicted loss ratios are negatively correlated with bin loss ratios. A negative slope trend line occurs when the predictive apparatus 12 is inaccurate, and the predictive apparatus 12 should be regenerated or otherwise corrected by the user 13. In this case, the loss control system 8 informs the user via the graphical user interface 11 that the predictive apparatus 12 is not predicting loss ratios properly. The user can then direct the loss control system 8 to either regenerate the predictive apparatus 12 or cease operation altogether, as shown by steps 230 and 232 in FIG. 14.

A trend line with a positive slope indicates that lower numbered bins, which contain data points with lower predicted loss ratios, have lower bin loss ratios than those of higher numbered bins. In this case, the predicted loss ratios estimate bin loss ratios well. It is equivalent in the statistical arts to say that the predicted loss ratios are positively correlated with bin loss ratios. A positive slope trend line occurs when the predictive apparatus 12 is accurate, and the loss control system 8 provided in accordance with the present invention determines, as designated by numeral 235 (FIG. 14), the extent to which premiums that policy holders are charged are in accordance with future, or potential, losses of the policy holders, based on known characteristics of the policy holders. In other words, the loss control system 8 determines the extent to which an actual loss ratio of a group of policy holders is in accordance with a calculated, or predicted, loss ratio.

The group generator 63 (FIG. 6) generates signals indicative of groups in dependence on the signals indicative of bins. Groups are combinations of bins which provide a convenient method of simultaneously addressing several bins which have similar bin loss ratios. In the preferred embodiment, the first bin and the last bin constitute a first and a last group respectively, as shown by step 234 in FIG. 14. As described previously, the first bin and the last bin each contain data points having predicted loss ratios which differ from the average predicted loss ratio by more than a prescribed number of standard deviations. Accordingly, the resultant first bin preferably contains approximately 2%–10% of all data points, the data points of the first bin having the lowest predicted loss ratios, and the resultant last bin preferably contains the approximately 2%–10% of all data points, the data points of the last bin having the greatest predicted loss ratios.

Also in the preferred embodiment, the group generator 63 generates signals indicative of groups comprising all bins except the first and last bins. The group generator 63 generates signals corresponding to four cumulative graphs, each cumulative graph representing a set of cumulative bin loss ratios. A cumulative bin loss ratio of a bin B is a sum of the losses of all bins up to and including the bin B divided by a sum of premiums of all bins up to and including the bin B. A process for generating four cumulative actual loss ratios for each bin is illustrated by Table 3 below.

TABLE 3

Cumulative Actual Loss Ratio Calculations

```
/* Calculate cumulative actual loss ratios of each bin */
For each Bin
{
    Sum the premiums of the data points in lower or equal numbered
    bins than this bin
    Sum the losses of the data points in the bins up to and including
    this bin
    Sum the losses of the data points within the 99th percentile
    loss level which
      are in the bins up to and including this bin
    Sum the losses of the data points within the 95th percentile
    loss level which
      are in the bins up to and including this bin
    Sum the losses of the data points within the 90th percentile
    loss level which
      are in the bins up to and including this bin
    Cumulative Loss Ratio of this Bin = Sum of the Losses /
            Sum of the Premiums
    Cumulative 99th Percentile Loss Ratio of this Bin =
        Sum of the 99th percentile Losses / Sum of the Premiums
    Cumulative 95th Percentile Loss Ratio of this Bin =
        Sum of the 95th percentile Losses / Sum of the Premiums
    Cumulative 90th Percentile Loss Ratio of this Bin =
        Sum of the 90th percentile Losses / Sum of the Premiums
}
```

Table 4 illustrates sample data points for which the cumulative actual loss ratio is calculated.

TABLE 4

Sample Cumulative Actual Loss Ratio Calculations

|  | Premiums | Actual Losses |
| --- | --- | --- |
| Bin 1, Point 1 | 100 | 50 |
| Bin 1, Point 2 | 120 | 60 |
| Bin 1, Point 3 | 50 | 30 |
| Bin 2, Point 1 | 100 | 60 |
| Bin 2, Point 2 | 89 | 50 |
| Bin 2, Point 3 | 30 | 20 |
| Bin 2, Point 4 | 60 | 40 |
| Bin 3, Point 1 | 120 | 90 |
| Bin 3, Point 2 | 60 | 45 |
| Bin 3, Point 3 | 40 | 25 |
| Bin 3, Point 4 | 40 | 30 |
| Bin 4, Point 1 | 30 | 25 |
| Bin 4, Point 2 | 60 | 50 |
| Bin 4, Point 3 | 120 | 100 |

TABLE 4-continued

Sample Cumulative Actual Loss Ratio Calculations

| Bin 4, Point 4 | 60 | 50 |
| --- | --- | --- |
| Bin 4, Point 5 | 90 | 75 |
| Bin 4, Point 6 | 110 | 95 |
| Bin 5, Point 1 | 90 | 100 |
| Bin 5, Point 2 | 100 | 85 |

| Bin | Sum up the premiums of the data points in this bin | Sum up the premiums of the data points in bins up to this bin (A) | Sum up the losses of the data points in this bin | Sum up the losses of the data points in bins up to this bin (B) | Cumulative Loss Ratio (B/A) |
| --- | --- | --- | --- | --- | --- |
| 1 | 270 | 270 | 140 | 140 | 0.52 |
| 2 | 270 | 540 | 170 | 310 | 0.57 |
| 3 | 260 | 800 | 190 | 500 | 0.625 |
| 4 | 470 | 1270 | 395 | 895 | 0.70 |
| 5 | 190 | 1460 | 185 | 1080 | 0.74 |

Figure 9:
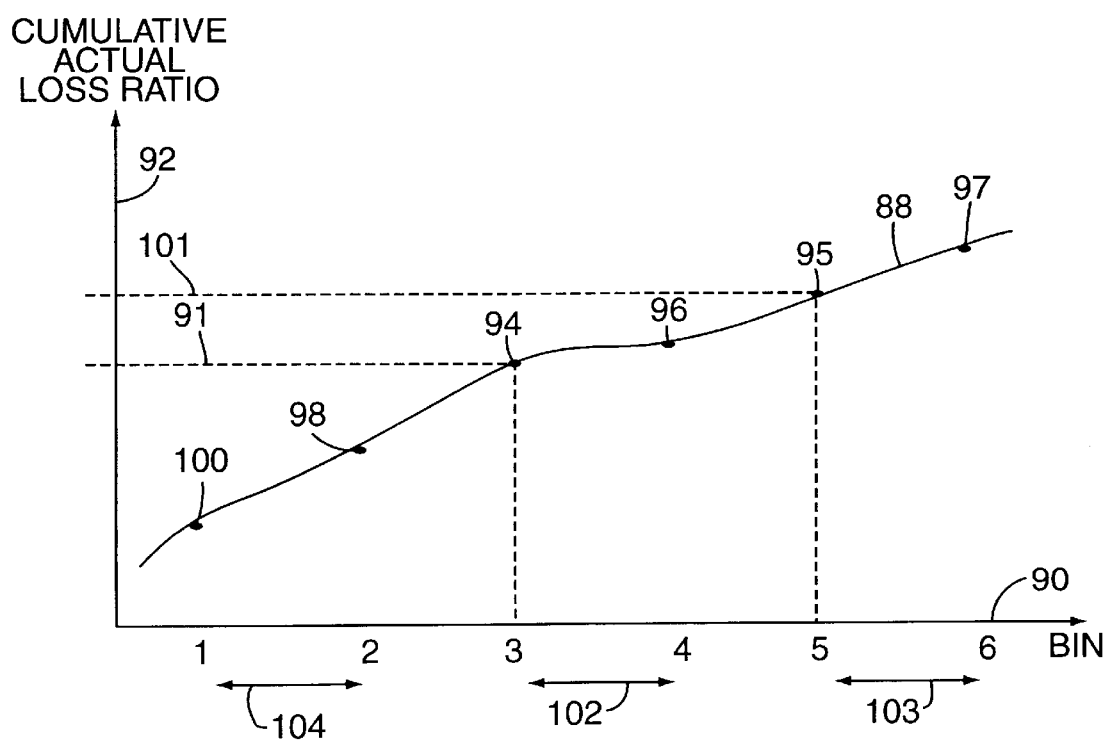
FIG. 9 is a diagrammatic illustration of a graph which illustrates a cumulative curve of cumulative actual loss ratios of data points.

FIG. 9 shows a diagrammatic illustration of a cumulative graph 88 of cumulative actual loss ratios of data points (not shown). Each of points 94, 95, 96, 97, 98 and 100 on the cumulative graph 88 has a position on an X-axis 90 and a Y-axis 92. The position of a point on the X-axis 90 is indicative of a bin of the point. The position of a point on the Y-axis 92 is indicative of a cumulative actual loss ratio of the point. Thus, each of the points 94, 95, 96, 97, 98 and 100 on the cumulative graph 88 represents a cumulative loss ratio which is associated with a bin. For example, the point 94 on the cumulative graph 88 is associated with the third bin. The point 94 further represents a cumulative loss ratio of 0.6, as designated by 91. The cumulative loss ratio of the third bin is therefore 0.6 in this example. As indicated hereinabove, the cumulative loss ratio of the third bin is the sum of the losses of the first, second and third bins divided by the sum of the premiums of the first, second and third bins.

Though one cumulative graph 88 is depicted in FIG. 9, in the preferred embodiment the group generator 63 generates four cumulative graphs as described hereinabove and represented by step 236 (FIG. 14) and in Table 3. A cumulative graph is generated for each of the bin loss ratios also described hereinabove. It is advantageous to generate signals indicative of a cumulative graph for each of the above described 90th, 95th and 99th percentile data points in order to remove atypically high losses from the set of data points under consideration.

The user 13 selects a one of the four cumulative graphs for the group generator 63 to use in generating the remaining groups, as shown by step 238 of FIG. 14. The user preferably uses expert judgment in selecting a cumulative graph which shows the bin loss ratio without atypical distortions due to uncharacteristic losses of certain data points. The user 13 preferably selects the graph which represents the 95th percentile cumulative actual loss ratio.

The group generator 63 generates groups from the selected cumulative graph, as shown by step 240 in FIG. 14. The cumulative graph reveals where increases in cumulative loss ratio from bin to bin occur, as well as where cumulative loss ratios are essentially unvarying among bins. The group generator 63 generates groups from bins which coincide with essentially constant portions of the cumulative graph. Points 94 and 96 (FIG. 9) coincide with a portion of the cumulative graph 88 which is essentially constant. The bins represented by points 94 and 96 thus form a group 102.

An increasing portion of a cumulative graph indicates a transition from one group to another group. The point 98 is at a midpoint of an increasing portion of the cumulative graph 88. A bin represented by the point 98 therefore designates the end of a group 104 and the start of a next group 102.

It is preferred that the number of data points comprising a group, or group size, be considered in determining how the group generator 63 combines bins to form groups. For example, it is undesirable for the group generator 63 to generate several groups which contain very few data points and a few groups which contain many data points. The preferred embodiment therefore further includes a group correction apparatus 65 which assures that the sizes of groups are neither too large nor too small, as shown by step 242 in FIG. 14. The group correction apparatus 65 combines undersized groups, such as adjacent groups which comprise less than a prescribed minimum number of data points, to form a larger group. Similarly, the group correction apparatus 65 divides an oversized group which comprises more than a prescribed maximum into several smaller groups. In the preferred embodiment, groups contain between 5% and 25% of all data points and there are between four and six groups, assuring that no group contains too few or too many data points. Of course, more or less groups may be used.

It is also preferred that a point on a cumulative loss ratio graph which corresponds to an average actual loss ratio lies at a boundary between two adjacent groups. For example, the point 95 in FIG. 9 is associated with the average actual loss ratio 101. It is thus preferable to make the point 95 a boundary of a group 103. In this manner, the group 102 to one side of the point 95 has an actual loss ratio below an average loss ratio 101, and the group 103 to the other side of the point 95 has an actual loss ratio above the average loss ratio 101. Though preferred, this situation is not always possible, especially if a cumulative curve is essentially flat, as when there is little overpricing and underpricing in an insurance classification plan.

The sizes of groups need not be equal. On the contrary, it is preferred that the sizes of the first and last groups be small relative to the sizes of the other groups. For example, in a set of six groups, a first and a sixth group can each comprise 7% of the data points, a second and a fifth group can each comprise 18% of the data points, and a third and a fourth group can each comprise 25% of the data points. As explained hereinabove, in the preferred embodiment the actual loss ratio of the third group is less than the average actual loss ratio and the actual loss ratio of the fourth group is greater than the average actual loss ratio.

Figure 10:
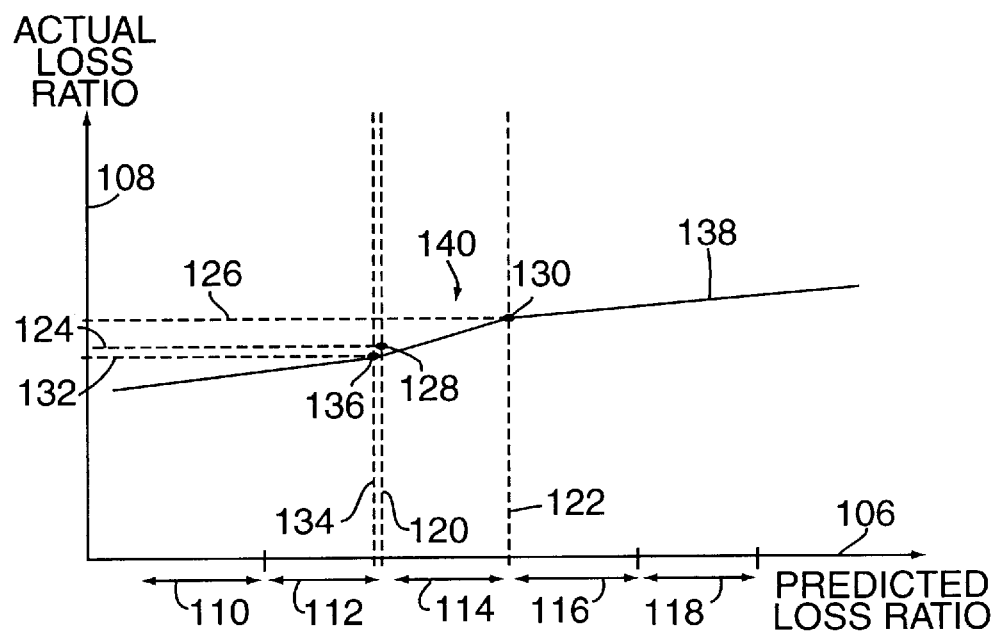
FIG. 10 is a diagrammatic illustration of a graph which illustrates a preferred method for mapping predicted loss ratios of data points to actual loss ratios.

The group curve generator 67 (FIG. 6) receives signals indicative of groups from the group generator 63, and generates in dependence thereupon signals indicative of group points and signals indicative of a group curve, as shown by step 244 of FIG. 14. An example of a group curve 138 is shown in FIG. 10. A group curve maps predicted loss ratios of bins to actual loss ratios of bins, as described hereinafter, and thereby is a best fit curve through, or a best fit functional relationship of, the group points. Each of the points 128, 130 and 136 on a group curve 138 has a position on an X-axis 106 and on a Y-axis 108. The position of a point on the X-axis 106 is indicative of a predicted loss ratio of the point. The position of a point on the Y-axis 108 is indicative of an actual loss ratio of the point. Thus, each of the points 128, 130 and 136 on the group curve 138 represents an actual loss ratio of a bin which is associated with a predicted loss ratio of a bin.

For clarity, FIG. 10 details a method of mapping predicted loss ratios to actual loss ratios within one group, which method is equally applicable to more than one group. The X-axis 106 corresponds to predicted loss ratios of the bins. The Y-axis 108 corresponds to actual loss ratios of the bins. Since a group by definition contains all consecutive bins within a given range of predicted loss ratios, the X-axis 106 is divided into non-overlapping regions 110, 112, 114, 116 and 118, each of which represents a group.

Within a group 114 a lowest predicted loss ratio 120 and a highest predicted loss ratio 122 respectively constitute a lower bound and an upper bound of the group 114. Two bins (not shown) which include the lower bound and the upper bound of the group 114 each have an actual loss ratio, hereinafter referred to as a lower bound actual loss ratio 124 and an upper bound actual loss ratio 126 respectively. An actual loss ratio of a bin with a predicted loss ratio 120 is defined as the sum of the losses of data points in the bin divided by the sum of premiums of the data points in the bin. In the preferred embodiment, the loss control system 8 imposes a maximum loss of the 99% loss level on all data points in calculating the actual loss ratio for a data point. In another embodiment, the loss control system 8 imposes a maximum loss of the 95% loss level on all data points in calculating the actual loss ratio for a data point. The benefits of imposing a maximum loss on data points has been discussed hereinabove.

The group 114 has two group points 128 and 130. The lower bound group point 128 represents a mapping from the lowest predicted loss ratio 120 to the lower bound actual loss ratio 124. The upper bound group point 130 represents a mapping from the highest predicted loss ratio 122 to the upper bound actual loss ratio 126.

When there are a non-trivial number of data points, in general more than one hundred data points, a lower bound of a first group is nearly equal to an upper bound of a group which precedes the first group. The lower bound predicted loss ratio 120 of the group 114 has a lower bound actual loss ratio 124. Similarly, the upper bound predicted loss ratio 134 of the group 112 has an upper bound actual loss ratio 132. The lower bound actual loss ratio 124 is virtually equal to the upper bound actual loss ratio 132, since the corresponding lower bound predicted loss ratio 120 of the group 114 is virtually equal to the upper bound predicted loss ratio 134 of the group 112. Therefore, only one of two group points 136 and 128 need be included in generating a group curve, described hereinafter. Accordingly, for N groups, there are N+1 group points which are used in generating a group curve.

In dependence on signals indicative of group points, the group curve generator 67 generates signals indicative of a group curve 138 (FIG. 10) which is a "best fit" curve through group points. The group curve 138 provides a method of calculating a derived actual loss ratio from a predicted loss ratio. In the preferred embodiment, the group curve 138 is a piecewise linear function wherein a line segment is fit to every two consecutive group points. As shown in FIG. 10, that portion 140 of the group curve 138 which corresponds to group 114 is a line segment, or linear function, which is determined by the two group points 128 and 130. Those skilled in the art will note that several types of curves may be fit to groups points, depending on the characteristics of the distribution of the group points. For example, if the distribution of the group points is not substantially linear, the group curve can be a combination of both linear, logarithmic and exponential curves, rather than a piecewise linear function. Similarly, a group curve may be a single best fit linear function through group points, if the distribution of group points is substantially linear.

As described hereinabove, a group curve provides a method of calculating a derived actual loss ratio from a predicted loss ratio. Components 61, 63, 65 and 67 of a relativity adjustment apparatus 16 thereby constitute a derived actual loss ratio generator 71. The derived actual loss ratio generator 71 generates, as described hereinabove, signals indicative of group points and signals indicated of a group curve. Accordingly, the derived actual loss ratio generator 71 is a mechanism which describes differences between predicted loss ratios and actual loss ratios. Thus, output signals from the derived actual loss ratio generator 71 describe groups of policy holders which are underpriced or which are overpriced. The output of the derived actual loss ratio generator 71 is thereby extremely useful to insurance companies in determining premium pricing effectiveness.

Figure 12:
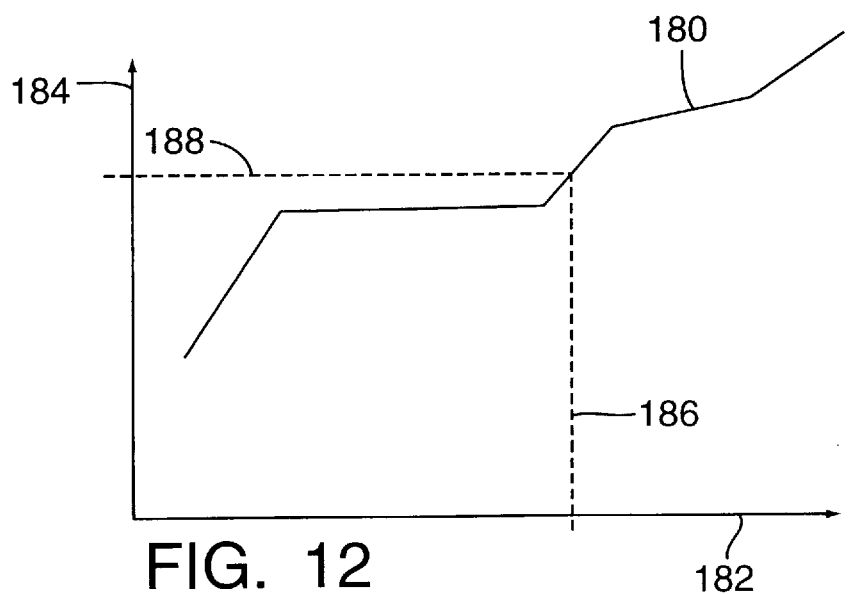
FIG. 12 is a diagrammatic illustration of a group curve which associates a set of predicted loss ratios with a set of derived actual loss ratios.
Figure 13:
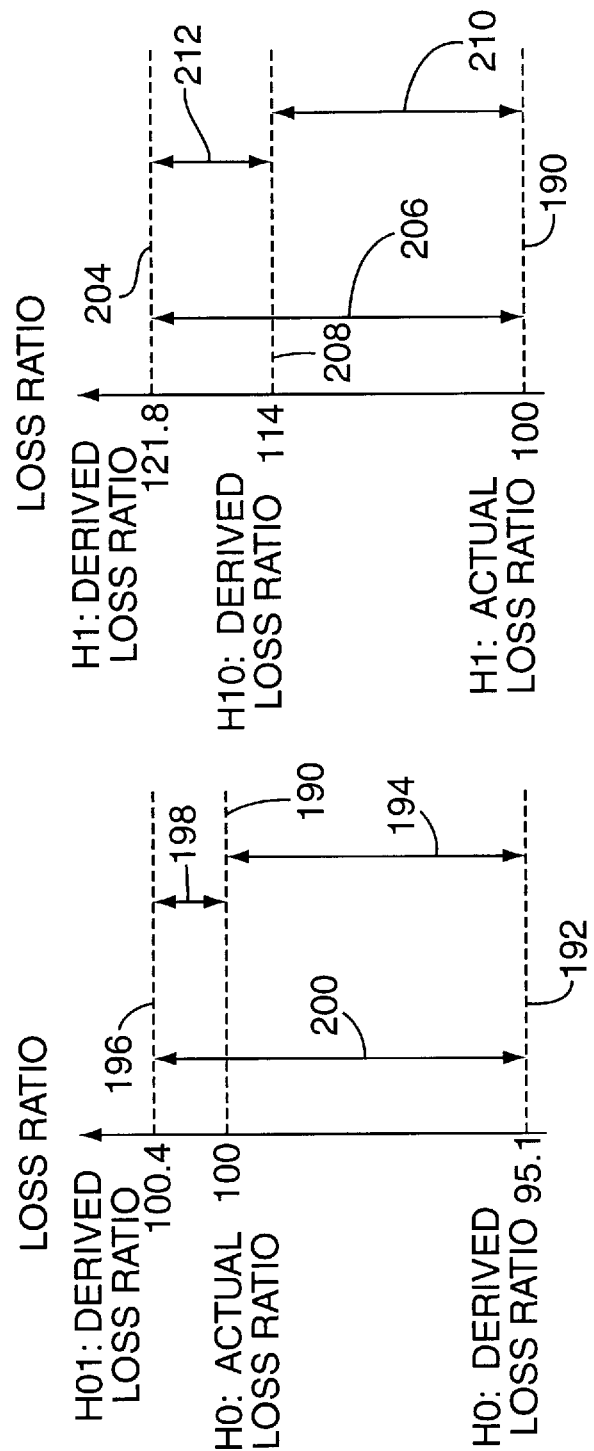
FIG. 13 is a diagrammatic illustration of results of the process of FIG. 11 for a sample set of inputs.

Subsequent to steps indicated by numeral 235 (FIG. 14), the relativity modifier 69 (FIG. 6) receives the signals indicative of a group curve, the signals indicative of actual loss ratios and the signals indicative of the classification plan variable values, and generates in dependence thereupon relativity adjustment signals in a manner described hereinafter with reference to FIGS. 11, 12 and 13, and further indicated by step 246 of FIG. 14. FIG. 11 illustrates a process 141 by which the relativity modifier 69 modifies relativities of a classification plan variable which is binary, or which can assume one of two values. FIG. 12 is a diagrammatic illustration of a group curve which associates a set of predicted loss ratios with a set of derived actual loss ratios. FIG. 13 is a diagrammatic illustration of results of the process 141 of FIG. 11 for a sample set of inputs. In the example of FIG. 13, the value of a classification plan variable H is used to indicate that a policy holder either owns a high loss potential vehicle (H=1) or does not own such a vehicle (H=0). In this example, a higher relativity exists for H=1 than for H=0 since higher losses are associated with H=1. The loss control system 8 determines how much, if at all, the relativities should be modified to more accurately predict the actual loss ratios of data points.

Steps described hereinafter which are performed by the present invention require calculation of an average actual loss ratio, an average predicted loss ratio and an average derived actual loss ratio of a set of data points. The average actual loss ratio of a set of data points is calculated by dividing a sum of all losses of the set of data points by a sum of all premiums associated with the set of data points. The average predicted loss ratio for a set of data points is the average of all predicted loss ratios which the predictive apparatus 12 generates in response to receiving the set of data points as inputs. As discussed hereinabove, the predictive apparatus 12 presents predicted loss ratio signals on line 24 for data points under consideration at step 218 in FIG. 14. The average derived actual loss ratio for a set of data points is calculated as a Y-coordinate of a point on a group curve whose X coordinate is the average predicted loss ratio for a set of data points. For example, FIG. 12 illustrates a group curve 180 which associates a set of predicted loss ratios on its X-axis 182 with a set of derived actual loss ratios on its Y axis 184. The group curve 180 maps a given predicted loss ratio 186 to a derived actual loss ratio 188. Thus, if a set of data points (not shown) has an average predicted loss ratio 186, then the average derived actual loss ratio for the set of data points is indicated by numeral 188.

For the example inputs indicated by FIG. 13, set H0 is a set of data points wherein H=0. The relativity modifier 69 (FIG. 6) generates signals indicative of an average actual loss ratio 190 (FIG. 13) for all data points, as shown in step 142 in FIG. 11. The relativity modifier 69 further generates signals indicative of an average predicted loss ratio for the set H0, shown in step 144 in FIG. 11. The average predicted loss ratio for the set H0 is an independent variable which maps to an average derived actual loss ratio 192 shown in FIG. 13, and also shown by step 146 in FIG. 11. A relative difference 194 between the average derived actual loss ratio 192 and the average actual loss ratio 190 is calculated, show in step 148. The relative difference 194 is expressed as a percentage of the average actual loss ratio 190. In the example of FIG. 13, the relative difference 194 is 4.9% less than the average actual loss ratio 190, or −4.9%.

The relativity modifier 69 next generates a set H01 of data points and further generates signals indicative of an average predicted loss ratio of the set H01, as shown in step 150. Values of classification plan variables associated with the data points in the set H01 are the same as values of the data points in the set H0, except that the value of the variable H is 1, not 0, for each data point in H01. Thus, for each data point in the set H0 there is a corresponding data point in H01 which is identical except for the value of the variable H. The relativity modifier 69 generates signals indicative of the average predicted loss ratio for the set H01, as shown in step 152 of FIG. 11. The average predicted loss ratio for the set H01 is an independent variable which maps to an average derived actual loss ratio 196 for the set H01, shown in FIG. 13 and also shown as step 154 in FIG. 11.

A relative difference 198 between the average derived actual loss ratio 196 for the set H01 and the average actual loss ratio 190 is calculated, as shown in step 156. The relative difference 198 is expressed as a percentage of the average actual loss ratio 190. In the example of FIG. 13, the relative difference 198 is 0.4% greater than the average actual loss ratio 190.

Therefore, the difference in a policy holder wherein H=0 and a policy holder wherein H=1 requires a change in the existing relativity by (0.4%−(−4.9%)), or 5.3%. A relative difference 194 for data points where H=0 is subtracted from the relative difference 198 for data points where H=1 because a data point wherein H=1 has a higher relativity factor than a data point wherein H=0. Accordingly, as shown in step 158 (FIG. 11) and FIG. 13, the relative difference 194 for data points where H=0 is subtracted from the relative difference 198 for data points where H=1 to yield a first relativity adjustment value 200 for the set H0. A first relativity adjustment value for the variable H therefore has the value 5.3% in this example. In other words, the difference between the relativity value for H=0 and the relativity value for H=1 should be increased 5.3%.

The steps 144, 146, 148, 150, 152, 154, 156 and 158 are repeated for the set H1, which is a set of data points wherein H=1. The relativity modifier 69 generates signals indicative of an average predicted loss ratio for the set H1, as shown in step 162. The average predicted loss ratio for the set H1 is an independent variable which maps to an average derived actual loss ratio 204 shown in FIG. 13, and as step 164 in FIG. 11. A relative difference 206 between the average derived actual loss ratio 204 and the average actual loss ratio 190 for the set H1 is calculated, shown in step 166. The relative difference 206 is expressed as a percentage of the average actual loss ratio 190. In the example of FIG. 13, the relative difference 206 is 21.8% greater than the average actual loss ratio 190.

The relativity modifier 69 next generates a set H10 of data points and further generates signals indicative of an average predicted loss ratio of the set H10, as shown in step 168. The values of classification plan variables associated with the data points in the set H10 are the same as those values for the data points in the set H1, except that the value of the variable H is 0, not 1, for each data point in H01. Thus, for each data point in the set H1 there is a corresponding data point in H10 which is identical except for the value of the variable H. The relativity modifier 69 generates signals indicative of the average predicted loss ratio for the set H10, as shown in step 170 of FIG. 11. The average predicted loss ratio for the set H10 is an independent variable which maps to an average derived actual loss ratio 208 for the set H10, shown in FIG. 13 and also as step 172 in FIG. 11.

A relative difference 210 between the average derived actual loss ratio 208 for the set H10 and the average actual loss ratio 190 is calculated, as shown in step 174. The relative difference 210 is expressed as a percentage of the average actual loss ratio 190. In the example of FIG. 13, the relative difference 210 is 14.0% greater than the average actual loss ratio 190.

Therefore, the difference in a policy holder wherein H=0 and a policy holder wherein H=1 requires a change in the existing relativity by (21.8%–14.0%), or 7.8%. The relative difference 210 for data points where H=0 is subtracted from the relative difference 206 for data points where H=1 because a data point wherein H=1 has a higher relativity factor than a data point wherein H=0. Accordingly, as shown in step 176 (FIG. 11) and FIG. 13, the relative difference 210 for data points where H=0 is subtracted from the relative difference 206 for data points where H=1 to yield a first relativity adjustment value 212 for the set H1. A second relativity adjustment value for the variable H therefore has the value 7.8% in this example. In other words, the difference between the relativity value for H=0 and the relativity value for H=1 should be increased 7.8%.

As shown in step 178, the relativity modifier 69 aggregates the first and second relativity adjustment values for the variable in question to obtain a desired relativity adjustment value for the variable. In the preferred embodiment, the desired relativity adjustment value is an average of the relativity adjustment values. In this example, the desired relativity adjustment value of the variable H is an average of the two relativity adjustment values 5.3% and 7.8%, designated by numerals 200 and 212, or the value 6.55%. Accordingly, the relativity adjustment apparatus 16 generates relativity adjustment signals which are indicative of the 6.55% increase in the difference between the relativity value for H=0 and the relativity value for H=1. Since the relativity value for H=0 is typically zero, the relativity value for H=1 is itself increased by 6.55%.

The manner in which the relativity modifier 69 modifies relativities of a classification plan variable which can assume one of more than two values is similar to the hereinabove described process of modifying binary variables. For example, in a classification plan where a variable N indicates a number of at-fault-claims for a policy holder, a data point wherein N=0 denotes no at-fault-claims, N=1 denotes one at-fault-claim and N=2 denotes more than one at-fault-claim. Since more at-fault claims implies more losses, a data point wherein N=2 has a higher relativity valve for N than a data point wherein N=1, and a data point wherein N=1 has a higher relativity valve for N than a data point wherein N=0.

A non-binary variable is treated as multiple binary variables in order to calculate the relativity adjustment values associated with the non binary variable. For example, for the variable N discussed hereinabove, the relativity modifier 69 first treats N as a binary variable which can assume the value 0 or 1. The relativity modifier 69 thereby generates signals indicative of a first desired relativity adjustment value in the manner discussed hereinabove and illustrated by FIG. 13 and step 178 in FIG. 11. Similarly, the relativity modifier 69 also treats N as a binary variable which can assume the value 1 or 2, and thereby generates signals indicative of a second desired relativity adjustment value in the manner discussed hereinabove and illustrated by FIG. 13 and step 178 in FIG. 11. In general, for a variable which assumes one of V values, where V is a number greater than one, the relativity modifier 69 generates signals indicative of (V-1) desired relativity adjustment values for the variable.

The present invention is not limited to insurance classification plans with the specific variables which were enumerated herein. It is desirable to include other variables which provide information regarding the losses of policy holders. Examples of such informative variables are the number of months since the last insurance claim, the credit history of the policy holder and the crime rate of the area in which the policy holder lives.

Although the invention has been shown and described with respect to a preferred embodiment thereof, it would be understood by those skilled in the art that other various changes omissions and additions thereto may be made without departing from the spirit and scope of the present invention.

What is claimed is:

1. A loss control system for an insurance classification plan for more accurately setting premium rates by more precisely determining expected losses, the insurance classification plan having a classification plan variable which represents an attribute of plurality of policy holders, the classification plan variable having a plurality of classification plan variable values, wherein each of the policy holders has a premium, an actual loss, a one the plurality of classification plan variable values, and an actual loss ratio,
   which actual loss ratio is a ratio of the actual loss to the premium, the system comprising:
   a policy holder database for generating a plurality of classification plan variable value signals, wherein each of the classification plan variable value signals is indicative of said classification plan variable value of a policy holder of the plurality of policy holders, and further for generating a plurality of actual loss signals, wherein each of the actual loss signals is indicative of the actual loss of a policy holder of the plurality of policy holders, and further for generating a plurality of premium signals, wherein each premium signal in the plurality of premium signals is indicative of the premium of a policy holder of the plurality of policy holders, and further for generating a plurality of actual loss ratio signals, wherein each of the actual loss ratio signals is indicative of the actual loss ratio of a policy holder of the plurality of policy holders;
   predictive means for receiving said plurality of classification plan variable value signals and for receiving said actual loss ratio signals, and further for generating in dependence thereupon a plurality of predicted loss ratio signals, wherein each of the predicted loss ratio signals is indicative of a predicted loss ratio of a policy holder of the plurality of policy holders;
   derived actual loss ratio generator means for receiving said plurality of classification plan variable value signals, said actual loss ratio signals and said predicted loss ratio signals, and further for generating in dependence thereupon derived actual loss ratio signals which are indicative of a difference between the predicted loss ratio and the actual loss ratio of a policy holder of the plurality of policy holders; and
   whereby said derived actual loss ratio signals are used to determine premium pricing effectiveness.

2. The loss control system of claim 1, further comprising:

a relativity database for generating a first set of relativity signals which are indicative of a plurality of relativity values, each relativity value of the plurality of relativity values having a one-to-one correspondence with a one of the plurality of classification plan variable values, wherein each relativity value of said plurality of relativity values represents a relationship between an expected loss and said classification plan variable value; and relativity adjuster means for receiving said plurality of classification plan variable signals, said actual loss ratio signals, said predicted loss ratio signals and said first set of relativity signals, and further for generating in dependence thereupon relativity adjustment signals which are indicative of prescribed adjustments to said first set of relativity signals; and wherein said relativity database further receives said relativity adjustment signals and generates in dependence thereupon a second set of relativity signals which are indicative of a plurality of relativity values which are adjusted in accordance with prescribed adjustments, said adjustment signals increasing or decreasing said second set of relativity values in dependence upon said relativity signals of succeeding classification plan variable value signals.

3. The loss control system of claim 1, further comprising a graphical user interface means for generating graphical signals in dependence on received display signals, wherein said graphical signals are indicative of images and text which are displayed to a user in graphical form and wherein said display signals are indicative of commands to display prescribed images and text to a user, said graphical user interface means further for receiving from the user input signals which are indicative of user input commands and for generating user command signals in dependence on said input signals, which user command signals control said policy holder database, said predictive means, and said derived actual loss ratio generator means in accordance with a prescribed process.

4. The loss control system of claim 1, wherein said derived actual loss ratio generator means comprises:

bin generator means for receiving said plurality of classification plan variable value signals, said actual loss ratio signals and said predicted loss ratio signals, and further for generating in dependence thereupon bin signals which are indicative of a plurality of bins, wherein each bin is indicative of a set of policy holders who have a predicted loss ratio within a prescribed range.

5. The loss control system of claim 4, wherein said derived actual loss ratio generator means further comprises:

group generator means for receiving said bin signals, and further for generating in dependence thereupon bin actual loss ratio signals, wherein each bin actual loss ratio signal is indicative of a sum of all actual losses of each policy holder of a bin divided by a sum of all premiums of each policy holder of a bin, and which group generator is further for generating, in dependence on said bin signals, trend line signals which are indicative of a best fit linear relationships among said bin actual loss ratio signals, and which group generator is further for generating, in dependence on said bin signals, group curve signals which are indicative of a plurality of groups, wherein each group is indicative of a prescribed set of bins.

6. The loss control system of claim 5, wherein said derived actual loss ratio generator means further comprises:

group curve generator means for receiving said trend line signals, and for generating in dependence thereupon group point signals which are indicative of group points, wherein each group point is indicative of a predicted loss ratio of policy holders of a bin and an actual loss ratio of policy holders of a bin, which group curve generator means is further for generating group curve signals which are indicative of a best fit curve through said group points.

7. A method of controlling loss for an insurance classification plan for setting premium rates which more precisely reflect expected losses, the insurance classification plan having a classification plan variable which represents an attribute of a plurality of policy holders, the classification plan variable having a plurality of classification plan variable values, wherein each of the policy holders has a premium, an actual loss, a one the plurality of classification plan variable values, and an actual loss ratio, which actual loss ratio is a ratio of the actual loss to the premium, the method comprising the steps of:

generating a plurality of classification plan variable value signals, wherein each of the classification plan variable value signals is indicative of said classification plan variable value of a policy holder of the plurality of policy holders;

generating a plurality of actual loss signals, wherein each of the actual loss signals is indicative of the actual loss of a policy holder of the plurality of policy holders;

generating a plurality of premium signals, wherein each premium signal in the plurality of premium signals is indicative of the premium of a policy holder of the plurality of policy holders;

generating a plurality of actual loss ratio signals, wherein each of the actual loss ratio signals is indicative of the actual loss ratio of a policy holder of the plurality of policy holders;

generating, in dependence upon said plurality of classification plan variable value signals and upon said actual loss ratio signals, a plurality of predicted loss ratio signals, wherein each of the predicted loss ratio signals is indicative of a predicted loss ratio of a policy holder of the plurality of policy holders; and generating, in dependence upon said plurality of classification plan variable value signals, said actual loss ratio signals and said predicted loss ratio signals, derived actual loss ratio signals which are indicative of a difference between the predicted loss ratio and the actual loss ratio of a policy holder of the plurality of policy holders; and whereby said derived actual loss ratio signals are used to determine premium pricing effectiveness.

8. The method of claim 7, further comprising the steps of:

generating a first set of relativity signals which are indicative of a plurality of relativity values, each relativity value of the plurality of relativity values having a one-to-one correspondence with a one of the plurality of classification plan variable values, wherein each said relativity value of said plurality of relativity values represents a relationship between an expected loss and said classification plan variable value;

generating, in dependence upon said plurality of classification plan variable value signals, said actual loss ratio signals, said predicted loss ratio signals and said first set of relativity signals, relativity adjustment signals which are indicative of prescribed adjustments to said first set of relativity signals;

generating in dependence upon said relativity adjustment signals, a second set of relativity signals which are indicative of a plurality of relativity values which are adjusted in accordance with said prescribed adjustments, said adjustment signals increasing or decreasing said second set of relativity values in dependence upon said relativity signals of succeeding classification plan variable value signals.

9. The method of claim 7, wherein the step of generating derived actual loss ratio signals which are indicative of a difference between the predicted loss ratio and the actual loss ratio of a policy holder of the plurality of policy holders comprises the step of:

generating, in dependence upon said plurality of classification plan variable value signals, said actual loss ratio signals and said predicted loss ratio signals, bin signals which are indicative of a plurality of bins, wherein each bin is indicative of a set of policy holders who have a predicted loss ration within a prescribed range.

10. The method of claim 9, wherein the step of generating derived actual loss ratio signals which are indicative of a difference between the predicted loss ratio and the actual loss ratio of a policy holder of the plurality of policy holders comprises the steps of:

generating, in dependence upon said bin signals, bin actual loss ratio signals, wherein each bin actual loss ratio signal is indicative of a sum of all actual losses of each policy holder of a bin divided by a sum of all premiums of each policy holder of a bin;

generating, in dependence on said bin signals, trend line signals which are indicative of a best fit linear relationships among said bin actual loss ratio signals; and generating, in dependence on said bin signals, group curve signals which are indicative of a plurality of groups, wherein each group is indicative of a prescribed set of bins.

11. The method of claim 10, wherein the step of generating derived actual loss ratio signals which are indicative of a difference between the predicted loss ratio and the actual loss ratio of a policy holder of the plurality of policy holders comprises the steps of:

generating, in dependence upon said trend line signals, group point signals which are indicative of group points, wherein each group point is indicative of a predicted loss ratio of policy holders of a bin and an actual loss ratio of policy holders of a bin; and generating group curve signals which are indicative of a best fit curve through said group points.

* * * * *